(12) United States Patent
Yun

(10) Patent No.: US 9,483,348 B2
(45) Date of Patent: *Nov. 1, 2016

(54) MEMORY MODULE, MEMORY SYSTEM HAVING THE SAME, AND METHODS OF READING THEREFROM AND WRITING THERETO

(71) Applicant: Samsung Electronics Co., Ltd., Suwon-si, Gyeonggi-do (KR)

(72) Inventor: Eun-Jin Yun, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/921,614

(22) Filed: Oct. 23, 2015

(65) Prior Publication Data

US 2016/0041876 A1  Feb. 11, 2016

Related U.S. Application Data

(62) Division of application No. 14/063,281, filed on Oct. 25, 2013, now Pat. No. 9,201,725.

(30) Foreign Application Priority Data

Nov. 1, 2012  (KR) .................. 10-2012-0122982

(51) Int. Cl.
*G06F 11/10* (2006.01)
*G06F 11/34* (2006.01)

(52) U.S. Cl.
CPC ....... *G06F 11/1076* (2013.01); *G06F 11/1004* (2013.01); *G06F 11/1048* (2013.01); *G06F 11/1068* (2013.01)

(58) Field of Classification Search
CPC .......... G06F 11/1004; G06F 11/1048; G06F 11/1068; G06F 11/1072; G06F 11/1076; G06F 11/1008; H03M 13/17; H03M 13/09; H04L 1/0057; H04L 1/0045
See application file for complete search history.

(56) References Cited

U.S. PATENT DOCUMENTS

| | | | |
|---|---|---|---|
| 5,513,135 A | 4/1996 | Dell et al. | |
| 5,732,208 A | 3/1998 | Tamura et al. | |
| 5,831,954 A * | 11/1998 | Sako .................. | G11B 20/1251 369/59.25 |
| 5,966,389 A | 10/1999 | Kiehl | |
| 6,961,890 B2 | 11/2005 | Smith | |
| 6,990,622 B2 | 1/2006 | Davis et al. | |
| 7,287,103 B2 | 10/2007 | Ganfield et al. | |
| 7,428,689 B2 | 9/2008 | Wallner et al. | |
| 7,787,297 B2 | 8/2010 | Jeon et al. | |

(Continued)

FOREIGN PATENT DOCUMENTS

| | | |
|---|---|---|
| JP | 09130269 | 5/1997 |
| JP | 2003115197 A | 4/2003 |

(Continued)

*Primary Examiner* — Cynthia Britt
*Assistant Examiner* — Dipakkumar Gandhi
(74) *Attorney, Agent, or Firm* — Harness, Dickey & Pierce, P.L.C.

(57) ABSTRACT

A method of reading from a memory module which includes a plurality of memories is provided. The method includes reading data corresponding to a plurality of burst length units from the plurality of memories; correcting an error of the read data using a storage error correction code; and outputting the error corrected data by a unit of data corresponding to one burst length unit.

16 Claims, 24 Drawing Sheets

(56) References Cited

U.S. PATENT DOCUMENTS

| | | |
|---|---|---|
| 7,945,840 B2 | 5/2011 | Schreck et al. |
| 8,055,976 B2 | 11/2011 | Kim et al. |
| 8,140,939 B2 | 3/2012 | Colmer et al. |
| 8,181,086 B2 | 5/2012 | Schreck et al. |
| 9,201,725 B2 * | 12/2015 | Yun |
| 2002/0009294 A1 * | 1/2002 | Nishimura .................... 386/124 |
| 2005/0005230 A1 * | 1/2005 | Koga ................. G06F 11/1008 714/800 |
| 2006/0047899 A1 * | 3/2006 | Ilda et al. ..................... 711/113 |
| 2006/0059298 A1 | 3/2006 | Cho et al. |
| 2006/0282747 A1 | 12/2006 | Hummler |
| 2007/0005831 A1 | 1/2007 | Gregorius |
| 2007/0255981 A1 | 11/2007 | Eto |
| 2008/0162991 A1 * | 7/2008 | Dell ................... G06F 11/1012 714/25 |
| 2009/0241009 A1 | 9/2009 | Kong et al. |
| 2010/0269012 A1 | 10/2010 | Hazelzet |
| 2012/0005559 A1 | 1/2012 | Jeong et al. |
| 2012/0254686 A1 | 10/2012 | Esumi et al. |
| 2013/0080716 A1 * | 3/2013 | Tamura ......................... 711/154 |
| 2013/0336489 A1 * | 12/2013 | Kato et al. .................... 380/285 |
| 2014/0082456 A1 | 3/2014 | Liu |

FOREIGN PATENT DOCUMENTS

| | | |
|---|---|---|
| JP | 2003131954 A | 5/2003 |
| JP | 2008160633 A | 7/2008 |
| JP | 2009501380 A | 1/2009 |
| JP | 2011515784 A | 5/2011 |
| KR | 19990044903 | 6/1999 |
| KR | 100227419 B1 | 11/1999 |
| KR | 20090119899 A | 11/2009 |
| KR | 20100104903 A | 9/2010 |

* cited by examiner

MEMORY MODULE, MEMORY SYSTEM HAVING THE SAME, AND METHODS OF READING THEREFROM AND WRITING THERETO

CROSS-REFERENCE TO RELATED APPLICATIONS

This application is a divisional of and claims priority under 35 U.S.C. §§120/121 to U.S. patent application Ser. No. 14/063,281, filed on Oct. 25, 2013, which claims priority under 35 U.S.C. §119 to Korean Patent Application No. 10-2012-0122982 filed Nov. 1, 2012, in the Korean Intellectual Property Office, the entire contents of each of which are hereby incorporated by reference.

BACKGROUND

Example embodiments of the inventive concepts described herein relate to a memory module, a memory system including the same, and methods of reading therefrom and writing thereto.

In general, a computer system may include a plurality of memory chips (e.g., DRAM) in a memory module form for high performance and large volume. A memory module may be implemented by mounting a plurality of memory chips on a printed circuit board. The memory module may be a single in memory module (hereinafter, referred to as SIMM) and a dual in memory module (hereinafter, referred to as DIMM). The SIMM may include a plurality of memory chips mounted on one side of a printed circuit board, and the DIMM may include a plurality of memory chips mounted on both sides of the printed circuit board.

SUMMARY

One aspect of embodiments of the inventive concepts is directed to provide a read method of a memory module which includes a plurality of memories, the read method comprising reading data corresponding to a plurality of burst length units from the plurality of memories; correcting an error of the read data using a storage error correction code ECC2; and outputting the error corrected data by a unit of data corresponding to one burst length unit.

In example embodiments, each of the plurality of memories is a nonvolatile memory.

In example embodiments, the output data includes user data and read parity bits for detecting an error of the user data and the read parity bits are generated using a transfer error correction code ECC1.

In example embodiments, the read method further comprises dividing the error corrected data by a unit of the user data; and generating read parity bits of the divided data using the transfer error correction code ECC1.

In example embodiments, the read method further comprises transferring the output data to a memory management unit controlling the memory module; and correcting an error of the data transferred to the memory management unit using the transfer error correction code ECC1.

In example embodiments, the read data is formed of a set of user data corresponding to the plurality of burst length units and a set of internal parity bits and the internal parity bits are generated using the storage error correction code ECC2 in the memory module.

In example embodiments, the read method further comprises determining whether a storage error of the read data is correctable.

In example embodiments, the read method further comprises if a storage error of the read data is uncorrectable, dividing the set of user data by a size of the user data; generating read parity bits of the divided data using the transfer error correction code ECC1; and outputting the divided data and the read parity bits.

In example embodiments, the storage error correction code ECC2 is different from the transfer error correction code ECC1.

In example embodiments, the read method further comprises transferring error information associated with error correction of the read data to a memory management unit after an error of the read data is corrected.

Another aspect of embodiments of the inventive concepts is directed to provide a memory module comprising memories performing a burst operation; an error correction circuit configured to receive N-bit data corresponding to a plurality of burst length units from the memories, to correct a storage error of the N-bit data using a storage error correction code ECC2, to divide the corrected data in plurality, to generate parity bits on each of the divided data using a transfer error correction code ECC1, and to sequentially output M-bit data corresponding to one burst length unit and formed of each of the divided data and the generated parity bit; a first buffer configured to store the M-bit data sequentially from the error correction circuit; and a second buffer configured to store the N-bit data.

In example embodiments, each of the memories is a magnetic resistance memory.

In example embodiments, the N-bit data is formed of a set of user data and a set of parity bits for detecting an error of the user data. The error correction circuit comprises a check bit generator configured to generate check bits based on the set of user data; a comparator configured to compare the check bits and the set of parity bits to generate a syndrome according to the comparison result; an error status register configured to store information indicating that the comparison result indicates generation of an error; an error correction engine configured to receive the set of user data and the syndrome and to correct an error of the set of user data using the storage error correction code ECC2; and a buffer configured to store the error corrected data.

In example embodiments, at a test operation, write data to be written corresponding to one burst length unit is directly stored at the memories without passing through the error correction circuit.

In example embodiments, at a burst write operation, data to be written corresponding to a plurality of burst length units is stored at the memories after an error of the data to be written is corrected by the error correction circuit.

In example embodiments, the M-bit data is output in response to a clock and the clock is generated in the memory module.

Still another aspect of embodiments of the inventive concepts is directed to provide a memory system comprising at least one memory module configured to read N-bit data corresponding to a plurality of burst length units from memories through a burst read operation, to correct a storage error of the read N-bit data using a storage error correction code ECC2, to divide the storage error corrected data in plurality, to generate read parity bits on each of the divided data using a transfer error correction code ECC1, and to sequentially output M-bit data (M<N) corresponding to one burst length unit and formed of each of the divided data and the generated parity bits; and a memory management unit configured to receive the M-bit data from the at least one memory module and to correct a transfer error of the M-bit data using the transfer error correction code ECC1.

In example embodiments, the at least one memory module sequentially receives M-bit data at a burst write operation and the input M-bit data includes user data and write parity bits for correcting an error of the user data.

In example embodiments, the at least one memory module corrects a transfer error of the input M-bit data using the transfer error correction code ECC1 at the burst write operation.

In example embodiments, the at least one memory module generates internal parity bits on a set of user data using the storage error correction code ECC2 at the burst write operation and the set of user data is formed of transfer error corrected user data corresponding to a plurality of burst length units.

In example embodiments, the at least one memory module stores M-bit data formed of the user data and a part of the internal parity bits at the burst write operation.

In example embodiments, at least one of the memories stores the internal parity bits.

In example embodiments, a memory, storing the internal parity bits, from among the memories is fixed.

In example embodiments, a memory, storing the internal parity bits, from among the memories is variable.

In example embodiments, the at least one memory module and the memory management unit are connected through lines for receiving a command, an address, a clock and data.

In example embodiments, the at least one memory module comprises a first error correction circuit configured to generate the read parity bits using the transfer error correction code ECC1 at the burst read operation, and the user data is a part of the read N-bit data and correspond to one burst length unit.

In example embodiments, the first error correction circuit corrects a transfer error of the input M-bit data at the burst write operation.

In example embodiments, the memory management unit further comprises a transfer error correction circuit configured to generate the write parity bits at the burst write operation.

In example embodiments, the at least one memory module stores the M-bit data directly at the memories without correction of a transfer error of the M-bit data at the burst write operation.

In example embodiments, the at least one memory module comprises a second error correction circuit configured to generate internal parity bits on a set of user data using the storage error correction code ECC2 at the burst write operation, and the set of user data is formed of user data corresponding to a plurality of burst length units and the read N-bit data is data formed of the set of user data and the internal parity bits.

In example embodiments, the at least one memory module comprises a plurality of memory modules connected with the memory management unit through a parallel interface.

In example embodiments, the at least one memory module comprises a plurality of memory modules connected with the memory management unit through a serial interface.

Further still another aspect of embodiments of the inventive concepts is directed to provide a driving method of a memory system which includes at least one memory module and a memory management unit controlling the at least one memory module. The driving method comprises reading data corresponding to a plurality of burst length units; performing a first error correction operation on the read data using a storage error correction code ECC2; dividing the data corrected through the first error correction operation by data corresponding to one burst length unit; and performing a second error correction operation on the divided data using a transfer error correction code ECC1 different from the storage error correction code ECC2.

In example embodiments, the storage error correction code is a BCH code and the transfer error correction code is a hamming code.

Still another aspect of embodiments of the inventive concepts is directed to provide a write method of a memory module which comprises receiving write data corresponding to a plurality of burst length units; correcting an error of the input write data by a burst length unit using a transfer error correction code ECC1; generating internal parity bits on the error corrected data using a storage error correction code ECC2; dividing the error corrected data by data corresponding to the burst length unit; and storing internal write data formed of the divided data and a part of the internal parity bits at a plurality of memories.

Further still another aspect of embodiments of the inventive concepts is directed to provide a parity bit generating method of a memory system which includes a memory module and a memory management unit managing the memory module. The parity bit generating method comprises generating write parity bits on user data using a transfer error correction code ECC1 in the memory management unit at a write operation; and providing write data corresponding to one burst length unit from the memory management unit to the memory module at the write operation so as to generate internal parity bits on a set of user data using a storage error correction code ECC2, the write data being formed of the user data and the write parity bits, wherein the set of user data is formed of user data corresponding to a plurality of burst length units.

In example embodiments, the parity bit generating method further comprises correcting the set of user data using the storage error correction code ECC2 in the memory module at a read operation; outputting user data, corresponding to one burst length unit, of the set of error corrected user data from the memory module at the read operation; and generating read parity bits on the output user data using the transfer error correction code ECC1 in the memory module at the read operation.

Another aspect of embodiments of the inventive concepts is directed to provide a memory module which comprises a plurality of memories; an error correction circuit configured to correct a transfer error of write data corresponding to one burst length unit using a transfer error correction code ECC1, to gather the corrected write data in plurality, to generate internal parity bits on the gathered write data and to store the gathered write data and the internal parity bits at the plurality of memories, at a write operation, and to correct a storage error of read data corresponding to a plurality of burst length units and read from the plurality of memories using the storage error correction code ECC2 at a read operation; and a buffer configured to receive the write data from an external device at the write operation and to receive the read data read from the plurality of memories at the read operation, A first latency for correcting the transfer error from a write command exists at the write operation and a second latency for correcting the storage error from a read command exists at the read operation.

In example embodiments, each of the plurality of memories is formed of a magnetic resistance memory.

In example embodiments, the write data is formed of user data and write parity bits.

In example embodiments, the read data is formed of user data and read parity bits.

In example embodiments, the error correction circuit generates the read parity bits using the transfer error correction code ECC1.

In example embodiments, the error correction circuit comprises a first error correction circuit configured to correct the transfer error; and a second error correction circuit configured to correct the storage error.

A data error correcting method of a memory module is further provided which comprises correcting a transfer error between an external device and the memory module by a first code word unit using a first error correction code ECC1; and correcting a storage error of data stored at the memory module by a second code word unit larger than the first code word unit using a second error correction code ECC2 different from the first error correction code ECC1.

According to example embodiments of the inventive concepts, a method of reading from a memory module which includes a plurality of memories includes reading, at the memory module, N-bit from the plurality of memories, the N-bit data including data corresponding to a plurality of burst length units, a burst length unit being an amount of data the memory module transfers in a burst data transfer operation of the memory module, N being a positive integer; correcting, at the memory module, an error of the N-bit read data using a storage error correction code; dividing the error corrected N-bit data into a plurality of M-bit data units, M being a positive integer less than N; and for each of the M-bit data units, generating, at the memory module, one or more read parity bits corresponding to the M-Bit data unit using a transfer error correction code different from the storage error code; and outputting the M-bit data unit from the memory module with the one or more read parity bits corresponding to the M-bit data unit.

The method may further include transferring the output M-bit data units from the memory module to a memory management unit (MMU) controlling the memory module; performing, at the MMU, an error detection operation on each of the M-bit data units using the one or more parity bits corresponding to each of the M-bit data units; and if one or more errors are detected in the M-bit data units, correcting the detected errors at the MMU using the transfer error correction code.

BRIEF DESCRIPTION OF THE FIGURES

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
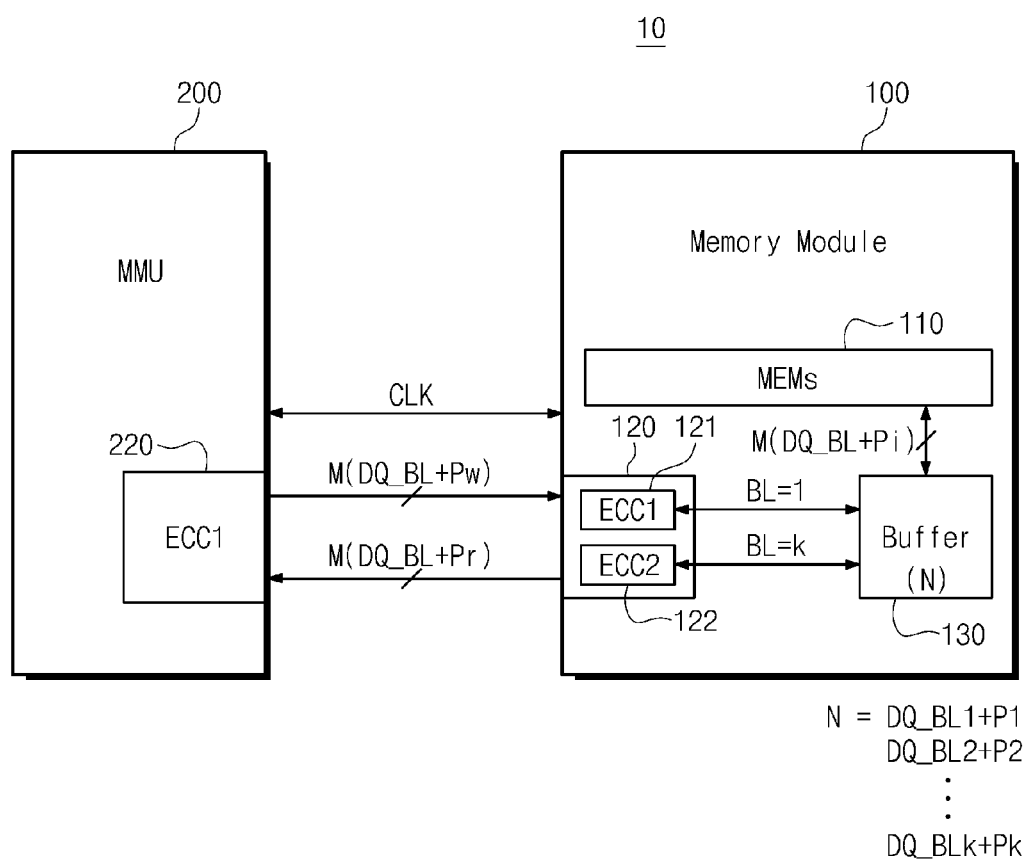
FIG. 1 is a block diagram schematically illustrating a memory system according to an embodiment of the inventive concepts.

Embodiments will be described in detail with reference to the accompanying drawings. Example embodiments of the inventive concepts, however, may be embodied in various different forms, and should not be construed as being limited only to the illustrated embodiments. Rather, these embodiments are provided as examples so that this disclosure will be thorough and complete, and will fully convey example embodiments of the inventive concepts to those skilled in the art. Accordingly, known processes, elements, and techniques are not described with respect to some of the embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from example embodiments of the inventive concepts.

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which examples embodiments of the inventive concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a memory system according to an embodiment of the inventive concepts. Referring to FIG. 1, a memory system 10 may include a memory module 100 and a memory management unit (MMU) 200 controlling the memory module 100.

The memory module 100 may be a device to store user data. The memory module 100 may include at least one memory 110, an error correction circuit 120, and a buffer 130.

The memory 110 may be a volatile memory device or a nonvolatile memory device. For example, the volatile memory device may be a DRAM, an SRAM, or the like. The nonvolatile memory device may be an MRAM (Magneto-resistive Random Access Memory), an RRAM (Resistive Random Access Memory), a PRAM (Phase-Change Memory), a FRAM (Ferroelectric Random Access Memory), an STT-RAM (Spin-Transfer Torque Random Access Memory), a NAND flash memory, a vertical NAND flash memory, a NOR flash memory, or the like.

The memory 110 may perform a burst operation. Herein, the burst operation may mean an operation of writing or reading a lot of data by sequentially increasing or decreasing an initial address provided from a memory management unit 200. A basic unit of the burst operation may be referred to a burst length BL. In example embodiments, the burst length BL may mean the number of operations of continuously reading or writing data by sequentially increasing or decreasing an initial address. For example, in the event that the memory 110 is a double data rate (DDR) MRAM and a burst length thereof is 8, it may perform a burst read or write operation eight times by sequentially increasing or decreasing an initial address in response to a clock CLK.

The error correction circuit 120 may include a first error correction circuit 121 and a second error correction circuit 122.

At a write operation, the error correction circuit 121 (or, referred to as a transfer error correction circuit) may correct an error of user data DQ_BL corresponding to a burst length unit (BL=1) using a first error correction code ECC1 (or, referred to as a transfer error correction code). At a read operation, the error correction circuit 121 may generate a parity bit (e.g., Pr) on user data DQ_BL corresponding to a burst length unit (BL=1).

At a write operation, the second error correction circuit 122 (or, referred to as a storage error correction circuit) may generate internal parity bits P1 to Pk of a set of user data [DQ_BL1:DQ_BLk] corresponding to plural burst length units (BL=k, k being an integer of 2 or more) using a second error correction code ECC2 (or, referred to as a storage error correction code). At a read operation, the second error correction circuit 122 may correct storage errors of the set of user data [DQ_BL1:DQ_BLk] corresponding to plural burst length units (BL=k) using the second error correction code ECC2.

In example embodiments, each of the first and second error correction codes ECC1 and ECC2 may be, for example, a BCH code, an RS (Reed Solomon) code, a hamming code, an LDPC (Low Density Parity Check) code, an RAID (Redundant Array of Independent Disks) code, a CRC (Cyclic Redundancy Check) code, or the like.

In example embodiments, the first error correction code ECC1 may be different from the second error correction code ECC2. For example, the first error correction code ECC1 may be the hamming code and the second error correction code ECC2 may be the BCH code. A size (e.g., BL=k) of a code word of the second error correction circuit 122 may be larger than that (e.g., BL=1) of the first error correction circuit 121.

In other example embodiments, the first error correction code ECC1 may be equal to the second error correction code ECC2, while a size (e.g., BL=k) of a code word of the second error correction circuit 122 may be different from that (e.g., BL=1) of the first error correction circuit 121.

Below, a burst write operation of the memory module 100 will be described.

At the burst write operation, the memory module 100 may sequentially write M-bit data DQ_BL+Pi at the memory 110 by continuously receiving k M-bit data DQ_BL+Pw in response to the clock CLK, sequentially correcting errors of the M-bit data DQ_BL+Pw using the first error correction code ECC1 of the error correction circuit 120, sequentially storing error-corrected user data DQ_BL corresponding to a burst length unit (BL=1) at the buffer 130, generate internal parity bits [P1:Pk] on stored user data DQ_BL1 to DQ_BLk corresponding to a burst length of k (BL=k) using the second error correction code ECC2 of the error correction circuit 120, dividing the internal parity bits [P1:Pk] by k, and using each of the k parity bits [P1:Pk] as a parity bit of error corrected user data DQ_BL corresponding to a burst length unit (BL=1).

Herein, the M-bit data DQ_BL+Pw may include user data DQ corresponding to a burst length and a write parity bit Pw for detecting an error of user data DQ_BL. The write parity bit Pw may be generated from an error correction circuit 220 in the memory management unit 200.

Below, a burst read operation of the memory module 100 will be described.

At the burst read operation, the memory module 100 may sequentially read k M-bit data DQ_BL+Pi from the memory 110 in response to the clock CLK, correct an error read user data DQ_BL1 to DQ_BLk corresponding to a burst length of k (BL=k) using the second error correction code ECC2 of the error correction circuit 120, divide error corrected user data DQ_BL1 to DQ_BLk by k, generate a read parity bit Pr on each of the k user data DQ_BL, and sequentially output M-bit data DQ_BL+Pr formed of user data DQ_BL corresponding to a burst length unit (BL=1) and a read parity bit Pr of the user data DQ_BL.

In other words, at the burst read operation, the memory module 100 may read N-bit data corresponding to a burst length of k (BL=k) from the memory 110, correct an error of the read N-bit data, and output the error corrected N-bit data by a unit of M-bit data corresponding to a burst length. Herein, the M-bit data DQ_BL+Pr output may include a parity bit Pr of the user data DQ_BL.

The memory module 100 of the inventive concepts may receive and output user data DQ_BL by a burst length unit using three types of M-bit data DQ_BL+Pw, DQ_BL+Pi, and DQ_BL+Pr. The three types of M-bit data DQ_BL+Pw, DQ_BL+Pi, and DQ_BL+Pr may include M-bit write data DQ_BL+Pw formed of user data DQ_BL and a write parity bit Pw, M-bit internal data DQ_BL+Pi formed of user data DQ_BL and an internal parity bit Pi, and M-bit read data DQ_BL+Pr formed of user data DQ_BL and a read parity bit Pr.

Also, the memory module 100 according to example embodiments of the inventive concepts may perform two error correction functions. The memory module 100 may reduce a transfer error, generated at data communication with the memory management unit 200, through the first error correction circuit 121 and a storage error, generated when data is stored, through the second error correction circuit 122.

Although not shown in figures, the memory module 100 may further comprise a phase locked loop (PLL), a delay locked loop (DLL), a power capacitor for providing for sudden power-off, a nonvolatile memory for storing SPD (Serial Presence Detection) information, and so on. Herein, the SPD (Serial Presence Detection) information may be used to set a mode register.

The memory management unit 200 may include the error correction circuit 220. At a burst write operation, the error correction circuit 220 may divide data to be written at the memory module 100 by user data DQ_BL corresponding to a burst length unit (BL=1), generate a write parity bit Pw corresponding to the user data DQ_BL using the first error correction code ECC1, and sequentially output M-bit data DQ_BL+Pw formed of the divided data DQ_BL and the write parity bit Pw.

At a burst read operation, the error correction circuit 220 may sequentially receive M-bit data DQ_BL+Pr from the memory module 100 and correct an error of the M-bit data DQ_BL+Pr using the first error correction code ECC1.

The memory system 10 according to an embodiment of the inventive concepts may correct a data transfer error through the first error correction circuit 121 and a storage error of stored data through the second error correction circuit 122. Thus, the reliability of data may be improved.

Also, the second error correction circuit 122 of the memory module 100 may buffer user data DQ_BL1 to DQ_BLk corresponding to a burst length of k (k being an integer of 2 or more) and correct errors of the buffered user data DQ_BL1 to DQ_BLk at once. Thus, compared with a case where there is corrected an error of user data DQ_BL corresponding to a burst length of 1 (BL=1), a size of a code word may become larger. This may mean that an error correction capacity of example embodiments of the inventive concepts is improved.

Figure 2:
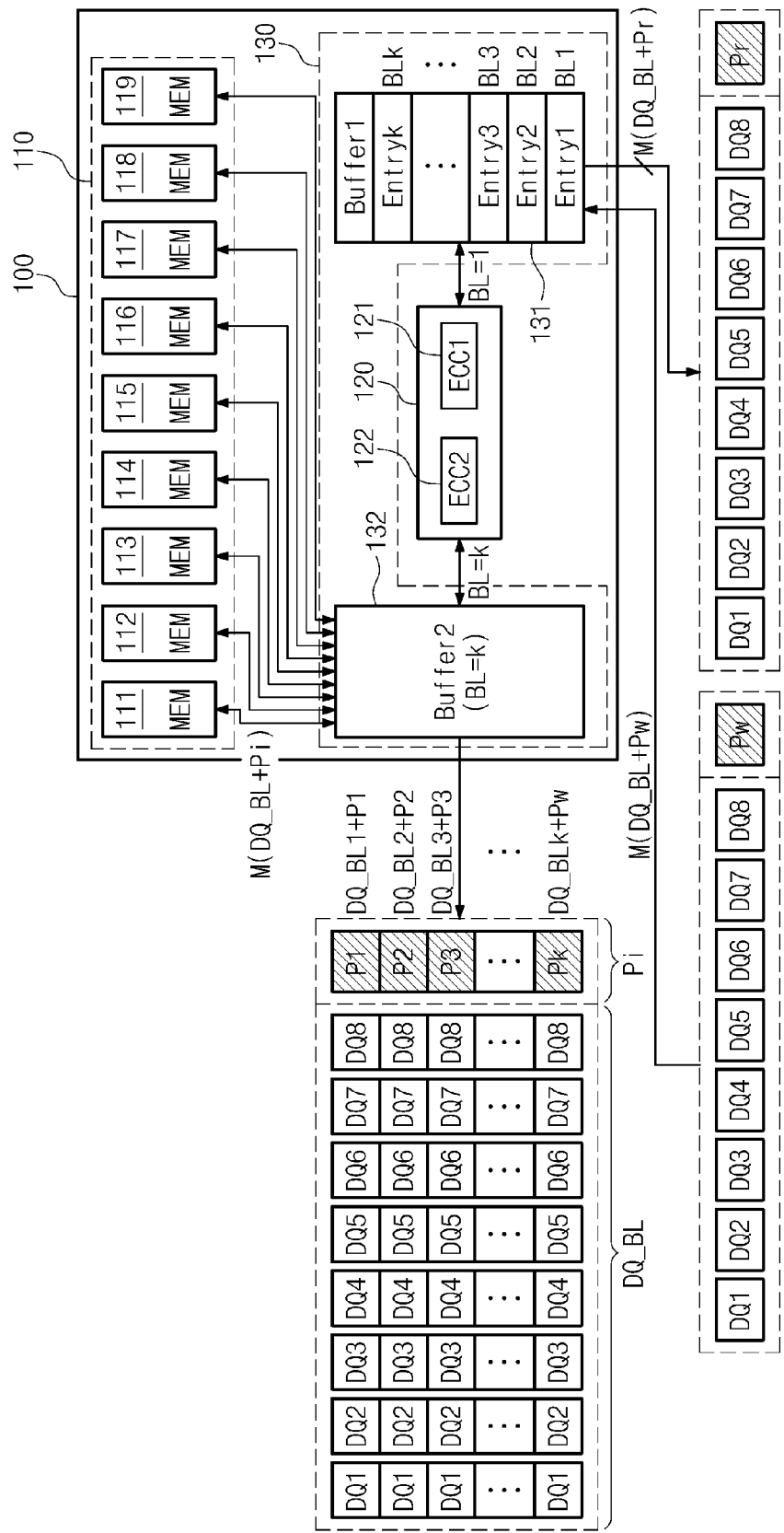
FIG. 2 is a block diagram schematically illustrating a memory module according to an embodiment of the inventive concepts.

FIG. 2 is a block diagram schematically illustrating a memory module according to an embodiment of the inventive concepts.

Referring to FIG. 2, a memory module 100 may include a memory 110 including a plurality of memories 111 to 119, an error correction circuit 120 including a first error correction circuit 121 and a second error correction circuit 122, and a buffer 130 including a first buffer 131 and a second buffer 132.

Each of the memories 111 to 119 may perform a burst operation. Each of the memories 111 to 119 may be formed of a volatile memory device or a nonvolatile memory device. At a write operation, at least one (e.g., 119) of the memories 111 to 119 may store a parity bit Pi and the remaining memories 111 to 118 may store user data DQ_BL. At a read operation, the memories 111 to 118 may output user data DQ_BL1 and the memory 119 may output a parity bit Pi. Each of the memories 111 to 119 may include a phase locked loop (PLL) or a delayed locked loop (DLL) synchronized with a clock CLK.

At a write operation, the error correction circuit 120 may receive user data DQ_BL corresponding to a burst length of 1 (BL=1) from the first buffer 131, correct a transfer error of the user data DQ_BL using a first error correction code ECC1, transfer error corrected user data DQ_BL to the second buffer 132, and generate internal parity bits [P1:Pk] on error corrected user data DQ_BL1 to DQ_BLk, corresponding to a burst length of k (BL=k) provided from the second buffer 132, using a second error correction code ECC2.

At a read operation, the error correction circuit 120 may receive user data DQ_BL1 to DQ_BLk corresponding to a burst length of k (BL=k) from the second buffer 132, correct errors of the user data DQ_BL1 to DQ_BLk using the second error correction code ECC2, divide error corrected user data DQ_BL1 to DQ_BLk by a burst length of 1 (BL=1), and generate a read parity bit Pr on each of the divided user data using the first error correction code ECC1. If an error of user data DQ_BL is perfectly recovered by the error correction circuit 120, the read parity bit Pr generated from the error correction circuit 120 may be equal to a write parity bit Pw output from a memory management unit 200.

At a write operation, the first buffer 131 may sequentially receive M-bit write data DQ_BL+Pw, formed of user data DQ_BL corresponding to a burst length of 1 (BL=1) and a write parity bit Pw, in response to a clock CLK and sequentially output the M-bit write data DQ_BL+Pw to the error correction circuit 120.

At a read operation, the first buffer 131 may sequentially receive M-bit write data DQ_BL+Pr formed of user data DQ_BL corresponding to a burst length of 1 (BL=1) and a read parity bit Pr and sequentially output the M-bit read data DQ_BL+Pr in response to the clock CLK.

The first buffer 131, as illustrated in FIG. 2, may include a plurality of entries Entry1 to Entryk.

At a write operation, the second buffer 132 may store user data DQ_BL1 to DQ_BLk error corrected using the first error correction code ECC1 in the error correction circuit 120 and internal parity bits P1 to Pk generated using the second error correction code ECC2 and sequentially output M-bit internal data DQ_BL+Pi corresponding to a burst length of 1 (BL=1) to the memories 111 to 119. Herein, the M-bit internal data DQ_BL+Pi may include user data DQ_BLi and an internal parity bit Pi.

At a read operation, the second buffer 132 may buffer N-bit data formed of user data DQ_BL1 to DQ_BLk and internal parity bits P1 to Pk sequentially output from the memories 111 to 119 and transfer the user data DQ_BL1 to DQ_BLk corresponding to a burst length of k (BL=k) to the error correction circuit 120.

The memory module 100 may include the memory 119 for storing an internal parity bit Pi. However, example embodiments of the inventive concepts are not limited thereto. For example, the particular memory used for storing an internal parity bit Pi may not be fixed to a single memory. According to example embodiments of the inventive concepts, any memory of a number of different memories within memory module 100 may be used. At least one of a plurality of memories may be selectively used to store an internal parity bit Pi. For example, the memory module 100 may perform a routing function capable of appointing a memory in which a parity bit is stored in a variable or dynamic manner, as opposed to a fixed manner.

In other example embodiments, in the event that the memory system 10 is applied to a computing system having a RAID (Redundant Array of Independent Disks) function, the internal parity bit Pi may be distributed and stored to a plurality of memories according to a RAID type. Herein, a location where an internal parity bit Pi is stored may be changed according to a RAID type.

In still other example embodiments, a plurality of internal parities required for the reliability of data may be distributed and stored to at least two memories.

The memory module 100 according to an embodiment of the inventive concepts may include the second buffer 132 for storing N-bit data corresponding to a burst length of k (BL=k) (k being an integer of 2 or more) and the error correction circuit 120 for correcting errors of user data DQ_BL1 to DQ_BLk included in the N-bit data, at a read operation. Thus, it is possible to improve an error correction capacity and the reliability of output data.

Figure 3:
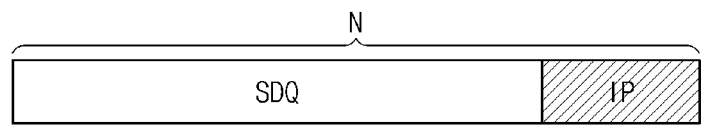
FIG. 3 is a diagram schematically illustrating structures of N-bit data and M-bit data of a memory module according to an embodiment of the inventive concepts.
Figure 3:
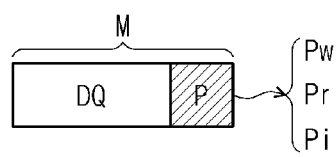

FIG. 3 is a diagram schematically illustrating structures of N-bit data and M-bit data of a memory module 100 according to an embodiment of the inventive concepts.

Referring to FIG. 3, N-bit data may be formed of a set SDQ of user data DQ_BL1 to DB_BLk (refer to FIG. 2) corresponding to a burst length of k (BL=k, k being an integer of 2 or more) and a set IP of internal parity bits P1 to Pk (refer to FIG. 2). M-bit data may be formed of user data DQ_BL corresponding to a burst length of 1 (BL=1) and a parity bit P thereof. Herein, the parity bit P may be one of a write parity bit Pw, an internal parity bit Pi and a read parity bit Pr according to a character of the M-bit data.

Figure 4:
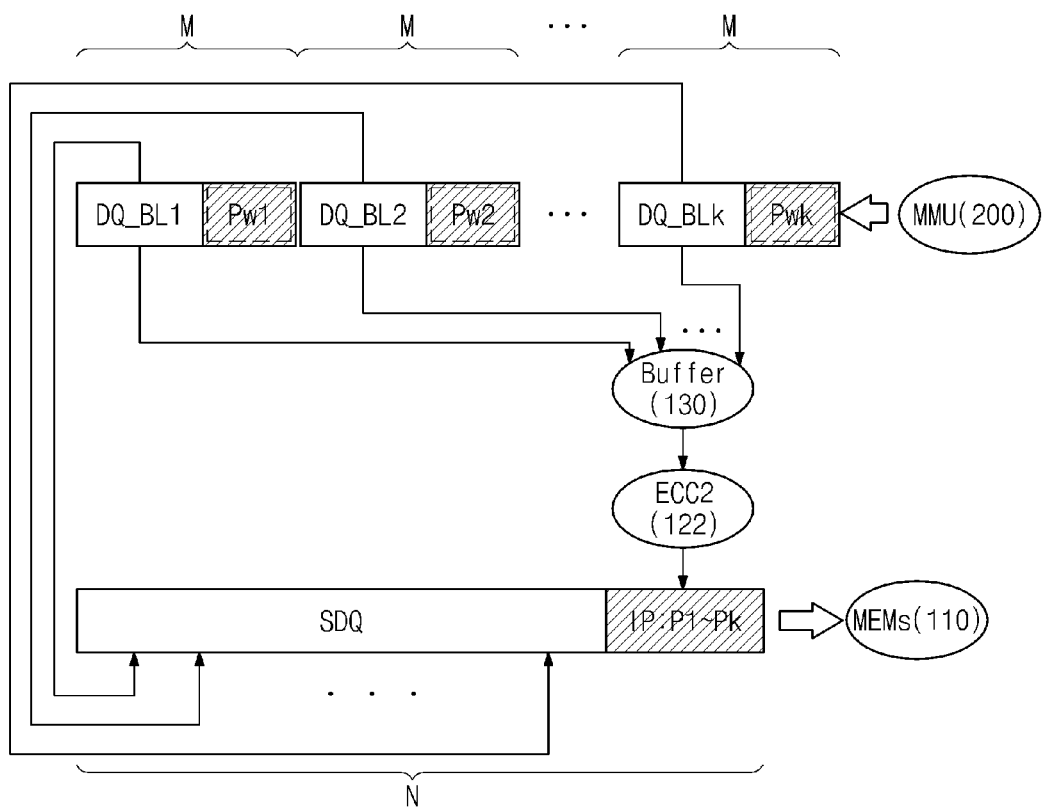
FIG. 4 is a diagram schematically illustrating an operation of generating N-bit data at a write operation.

FIG. 4 is a diagram schematically illustrating an operation of generating N-bit data at a write operation.

Referring to FIG. 4, at a write operation, N-bit data stored at a second buffer 132 (refer to FIG. 2) may be formed of a set of user data SDQ and a set of internal parity bits IP. The set of user data SDQ may be formed of user data DQ_BL1 to DQ_BLk of k M-bit data DQ_BL1+Pw1 to DQ_BLk+Pwk sequentially received from a memory management unit 200 (refer to FIG. 1). The set of internal parity bits IP may be formed of internal parity bits P1 to Pk (refer to FIG. 2) of the user data DQ_BL1 to DQ_BLk. Herein, the internal parity bits P1 to Pk may be generated from a second error correction circuit 122 (refer to FIG. 1). N-bit data SDQ+IP generated at a write operation may be stored at the memory 110 by a burst length unit.

Figure 5:
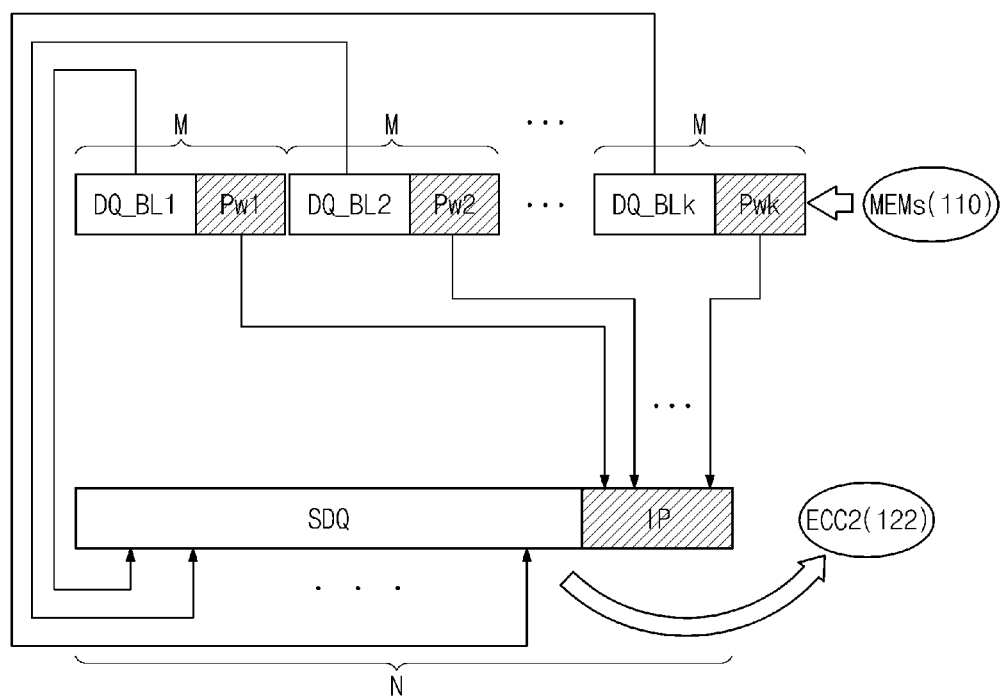
FIG. 5 is a diagram schematically illustrating an operation of generating N-bit data at a read operation.

FIG. 5 is a diagram schematically illustrating an operation of generating N-bit data at a read operation.

Referring to FIG. 5, at a read operation, N-bit data stored at a second buffer 132 (refer to FIG. 2) may be formed of a set of user data SDQ and a set of internal parity bits IP. The set of user data SDQ may be formed of user data DQ_BL1 to DQ_BLk of k M-bit data DQ_BL1+P1 to DQ_BLk+Pk sequentially read from a memory 110 (refer to FIG. 1). The set of internal parity bits IP may be formed of internal parity bits P1 to Pk of k M-bit data DQ_BL1+P1 to DQ_BLk+Pk sequentially read from the memory 110. The user data set SDQ of the N-bit data SDQ+IP may be transferred to a second error correction circuit 122 to correct an error generated when data is stored.

Figure 6:
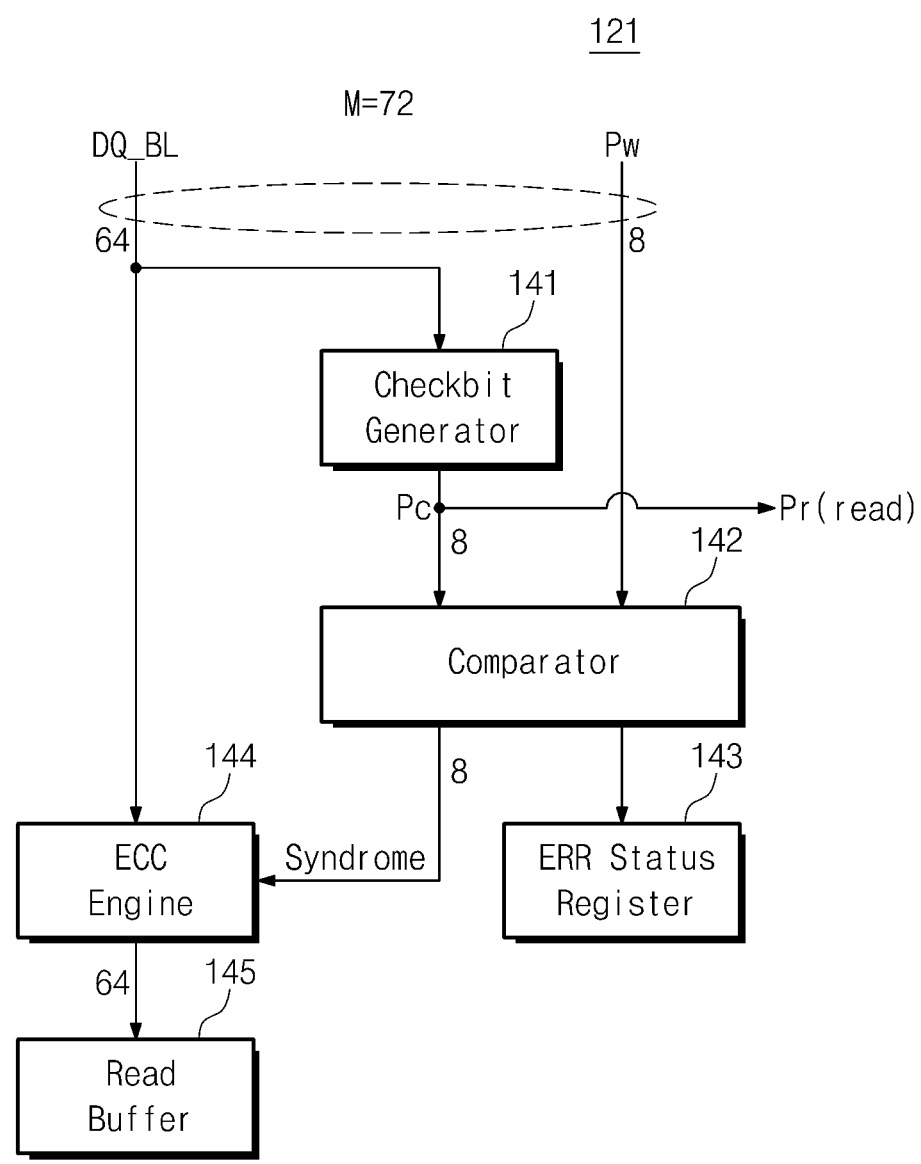
FIG. 6 is a block diagram schematically illustrating a first error correction circuit of FIG. 2.

FIG. 6 is a block diagram schematically illustrating a first error correction circuit of FIG. 2.

Referring to FIG. 6, a first error correction circuit 121 may include a check bit generator 141, a comparator 142, an error status register 143, an ECC engine 144, and a read buffer 145. For ease of description, it is assumed that M-bit data is formed of 64-bit user data DQ_BL (refer to FIG. 3) corresponding to a burst length of 1 (BL=1) and 8 parity bits Pw.

The check bit generator 141 may receive 64-bit user data DQ_BL from a first buffer 131 (refer to FIG. 2) to generate 8 check bits Pc corresponding to the input user data DQ_BL. The comparator 142 may detect an error by comparing 8 check bits from the check bit generator 141 and 8 parity bits from a first buffer 131. Also, the comparator 142 may generate a syndrome for correcting an error generated. When a comparison result indicates that an error is detected, the error status register 143 may store information indicating that an error is detected. The ECC engine 144 may receive the 64-bit user data from the first buffer 131 and the syndrome from the comparator 142, detect a location of an error using a first error correction code ECC1 and correct an error corresponding to the detected location. Herein, the first error correction code ECC1 may be a hamming code. The read buffer 145 may store error corrected user data DQ_BL.

The above-described first error correction circuit 121 may correspond to an ECC decoder used at a write operation. The first error correction circuit 121 may further comprise an ECC encoder used at a read operation. Herein, the ECC encoder may be formed of a parity generator which generates read parity bits Pr of user data DQ_BL corresponding to a burst length of 1 (BL=1). The parity generator may be the check bit generator 141. Alternatively, the parity generator may be formed of a separate component having the same structure of that of the check bit generator 141.

A first error correction circuit 131 according to an embodiment of the inventive concepts may correct an error of user data DQ_BL corresponding to a burst length of 1 (BL=1) in real time at a write operation and generate read parity bits Pr of user data DQ_BL corresponding to a burst length of 1 (BL=1) in real time at a read operation.

Figure 7:
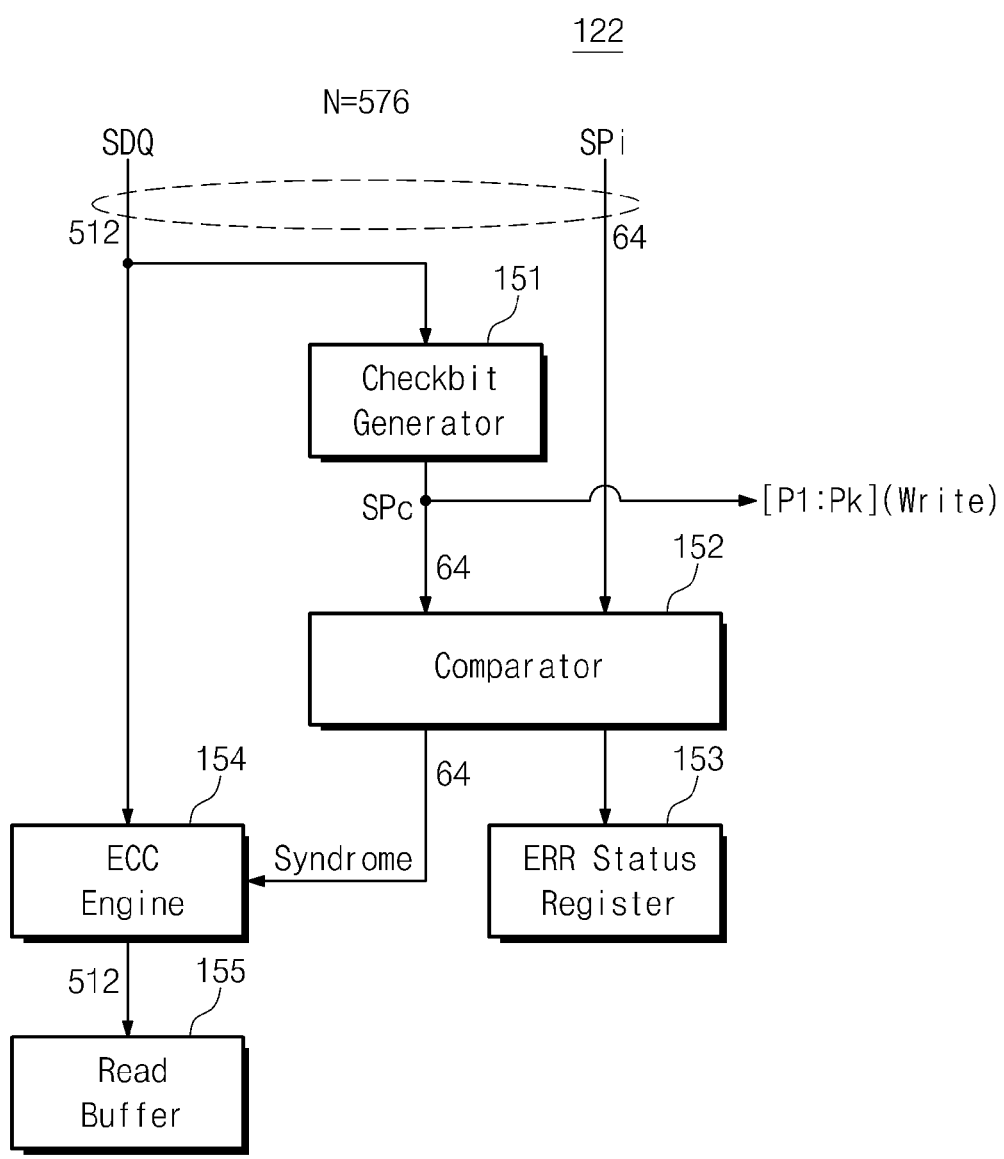
FIG. 7 is a block diagram schematically illustrating a second error correction circuit of FIG. 2.

FIG. 7 is a block diagram schematically illustrating a second error correction circuit of FIG. 2.

Referring to FIG. 7, a second error correction circuit 122 may include a check bit generator 151, a comparator 152, an error status register 153, an ECC engine 154, and a read buffer 155. For ease of description, it is assumed that N-bit data is formed of a 512-bit user data set SDQ (refer to FIG. 3) corresponding to a burst length of 8 (BL=8) and a set of 64 internal parity bits SPw (refer to FIG. 3).

At a read operation, the check bit generator 151 may receive the 512-bit user data set SDQ from a second buffer 132 to generate 64 check bits SPc corresponding to the input user data set SDQ.

The comparator 152 may detect an error by comparing 64 check bits SPc from the check bit generator 151 and the set of 64 internal parity bits SPw from the second buffer 132. Also, the comparator 152 may generate a syndrome for correcting an error generated. Herein, the syndrome may include information associated with an error location. When a comparison result indicates that an error is detected, the error status register 153 may store information indicating that an error is detected.

The ECC engine 154 may receive the 512-bit user data set SDQ from the second buffer 132 and the syndrome from the comparator 152, detect a location of an error using a second error correction code ECC2 and correct a bit value of an error corresponding to the detected location. Herein, the second error correction code ECC2 may be a BCH code. The read buffer 155 may store error corrected user data set SDQ.

The above-described second error correction circuit 122 may correspond to an ECC decoder used at a read operation. The second error correction circuit 122 may further comprise an ECC encoder used at a write operation. Herein, the ECC encoder may be formed of a parity generator which generates internal parity bits [P1:Pk] of the user data set SDQ corresponding to a burst length of 8 (BL=8). The parity generator may be the check bit generator 151. Alternatively, the parity generator may be formed of a separate component having the same structure of that of the check bit generator 151.

The second error correction circuit 122 according to an embodiment of the inventive concepts may generate internal parity bits [P1:Pk] of the user data set SDQ for correction of a data storage error at a write operation and correct an error of the user data set SDQ corresponding to a burst length of 8 (BL=8) at a read operation.

Figure 8:
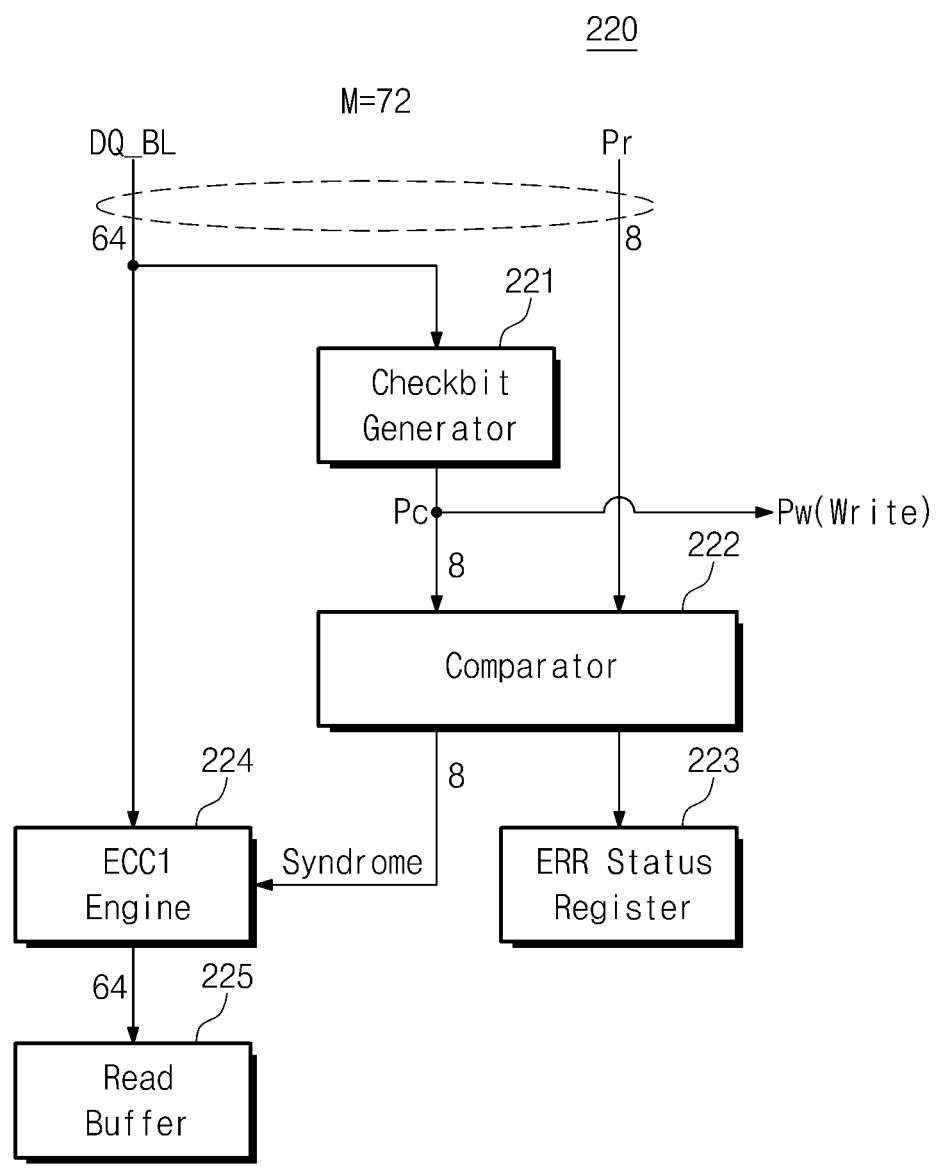
FIG. 8 is a block diagram schematically illustrating an error correction circuit of a memory management unit of FIG. 2.

FIG. 8 is a block diagram schematically illustrating an error correction circuit of a memory management unit of FIG. 2.

Referring to FIG. 8, an error correction circuit 220 may be equal to a first error correction circuit 121 of a memory module 100 illustrated in FIG. 6.

The error correction circuit 220 may correspond to an ECC decoder used at a read operation. The error correction circuit 220 may further comprise an ECC encoder used at a write operation. Herein, the ECC encoder may be formed of a parity generator which generates write parity bits Pw of user data DQ_BL corresponding to a burst length of 1 (BL=1). The parity generator may be a check bit generator 221 of FIG. 8. Alternatively, the parity generator may be formed of a separate component having the same structure of that of the check bit generator 221.

The error correction circuit 220 according to an embodiment of the inventive concepts may generate write parity bits Pw of user data DQ_BL corresponding to a burst length of 1 (BL=1) in real time at a write operation and correct an error of user data DQ_BL corresponding to a burst length of 1 (BL=1) in real time at a read operation.

Meanwhile, each of memories 111 to 119 in FIG. 2 may be formed of an MRAM (Magneto-resistive Random Access Memory). Below, it is assumed that each of memories 111 to 119 in FIG. 2 is formed of an MRAM.

Figure 9:
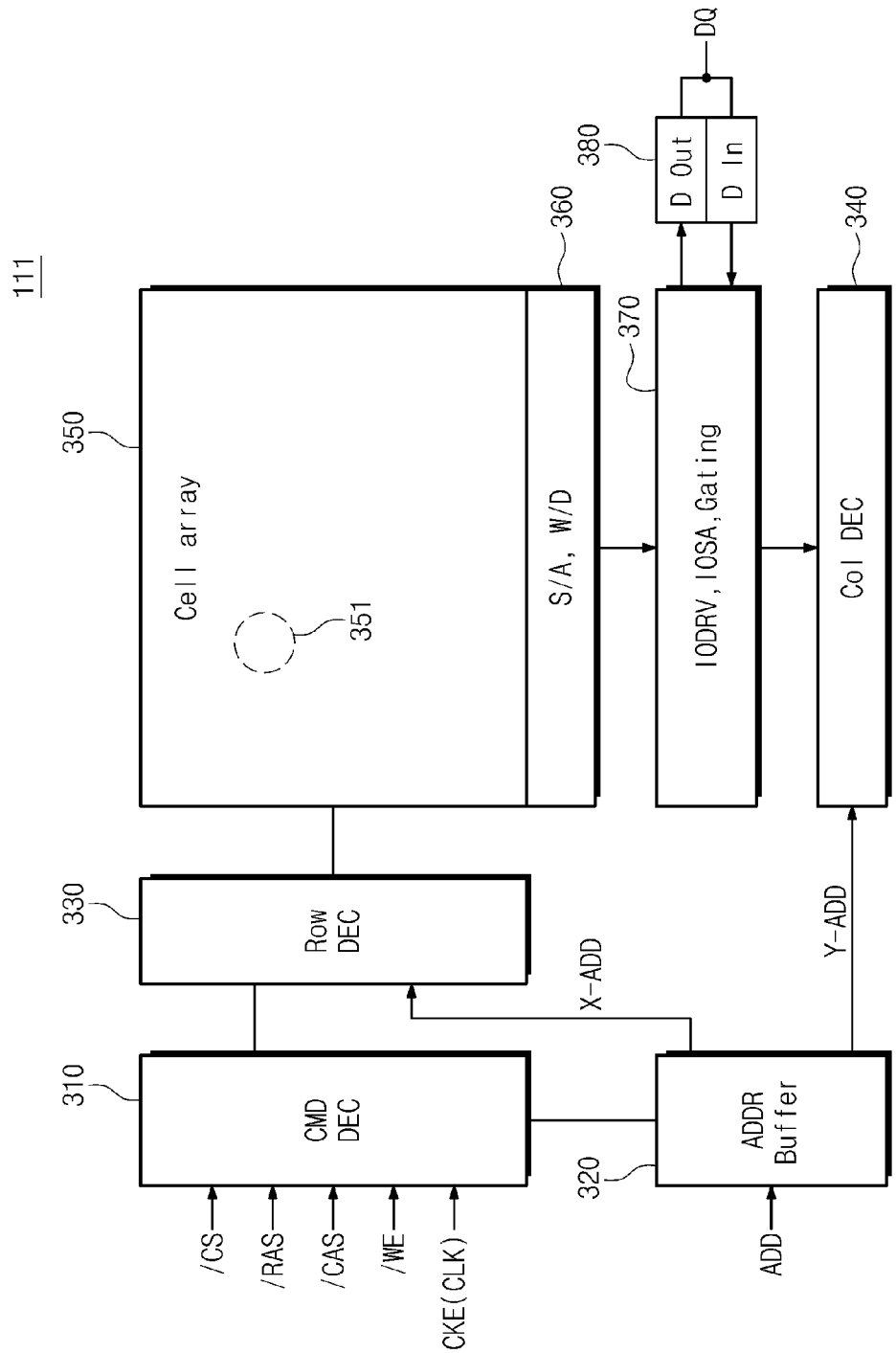
FIG. 9 is a block diagram schematically illustrating a memory according to an embodiment of the inventive concepts.

FIG. 9 is a block diagram schematically illustrating a memory 111 according to an embodiment of the inventive concepts.

Referring to FIG. 9, a memory 111 may include a command decoder 310, an address buffer 320, a row decoder 330, a column decoder 340, a cell array 350, a write drive/sense amplifier unit 360, an input/output driver unit 370, and a data input/output unit 380.

The command decoder 310 may receive and decode a chip select signal /CS, a row address strobe signal /RAS, a column address strobe /CAS, a write enable signal /WE, and a clock enable signal CKE.

In example embodiments, the chip select signal /CS, the row address strobe signal /RAS, the column address strobe /CAS, the write enable signal /WE, and the clock enable signal CKE may be provided from a memory management unit 200 (refer to FIG. 1).

In other example embodiments, the chip select signal /CS, the row address strobe signal /RAS, the column address strobe /CAS, the write enable signal /WE, and the clock enable signal CKE may be provided from an internal circuit of a memory module 100 (refer to FIG. 1).

After decoding is ended, the memory 111 may execute a command of the memory management unit 200. The address buffer 320 may store an address ADD received from the memory management unit 200. The address buffer 320 may transfer a row address X-ADD to the row decoder 330 and a column address Y-ADD to the column decoder 340. Each of the row decoder 330 and the column decoder 340 may include a plurality of MOS transistor-based switches. The row decoder 330 may select a word line in response to the row address, and the column decoder 340 may select a bit line in response to the column address.

The cell array 350 may include an STT-MRAM cell 351 located at an intersection of a word line and a bit line. The STT-MRAM cell 351 may be a resistive memory cell. Thus, the STT-MRAM cell 351 may have a relatively large resistance value or a relatively small resistance value according to data stored therein. At a data read operation, a data voltage may vary according to a resistance value of the STT-MRAM cell 351 and be provided to the write driver/sense amplifier unit 360. The write driver/sense amplifier unit 360 may include a plurality of sense amplifiers for sensing and amplifying a data voltage, and may output a digital data signal based on the data voltage.

A data signal processed by the write driver/sense amplifier unit 360 may be transferred to the data input/output unit 380 through the input/output driver unit 370. The data input/output unit 380 may output input data to the memory management unit 200.

Figure 10:
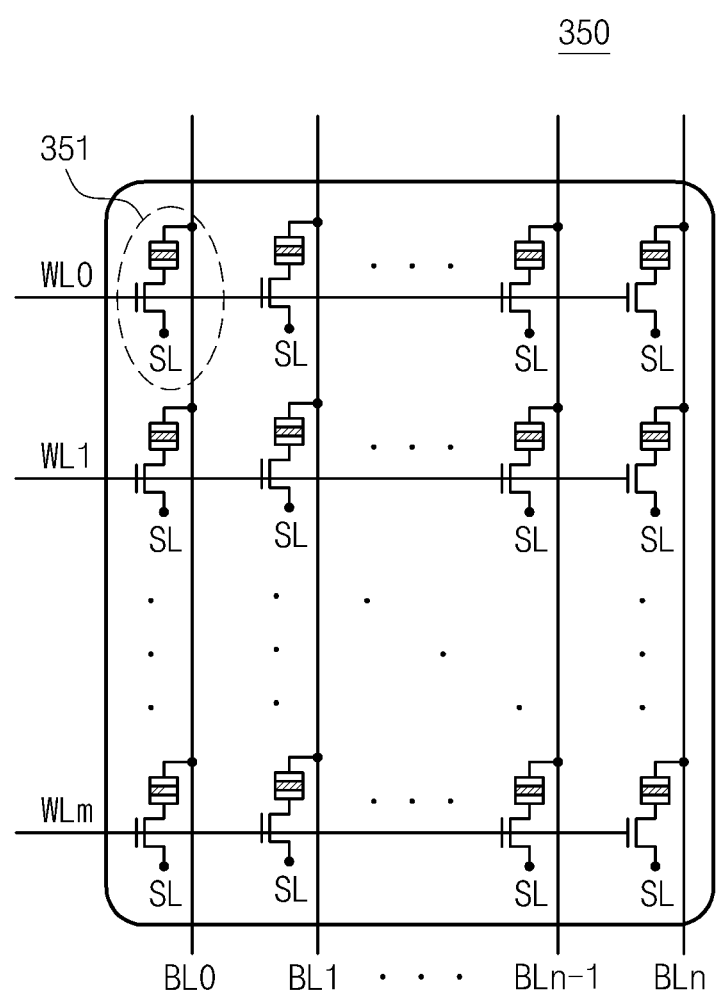
FIG. 10 is a diagram schematically illustrating a cell array of FIG. 9.

FIG. 10 is a diagram schematically illustrating a cell array of FIG. 9.

Referring to FIG. 10, a cell array 330 may include word lines WL0 to WLm (m being a natural number of 1 or more), bit lines BL0 to BLn (n being a natural number of 1 or more), and memory cells 351 arranged at intersections of the word lines WL0 to WLm and the bit lines BL0 to BLn. In the event that each memory cell 351 is formed of an STT-MRAM cell, it may include a magnetic tunnel junction (hereinafter, referred to as MTJ) element having a magnetic material. Each of the memory cells 351 may include a cell transistor and an MTJ element. The cell transistors may be switched by signals from a row decoder 330 (refer to FIG. 9).

In each memory cell 351, a cell transistor and an MTJ element may be connected between a corresponding bit line and a source line SL. Although not shown in FIG. 10, the memory cells 351 may be connected in common with the same source line SL. The MTJ elements may be replaced with a resistive element of a PRAM (Phase Change Random Access Memory) using a phase change material, an RRAM (Resistive Random Access Memory) using a variable resistance material (e.g., Complex Metal Oxide) or an MRAM (Magnetic Random Access Memory) using a ferromagnetic material. A resistance value of a material of a resistive element may vary according to a level or direction of a current or voltage. Although a current or a voltage is blocked, a resistance value may be maintained.

The bit lines BL0 to BLn may be connected with a write driver/sense amplifier unit 360 (refer to FIG. 9). The write driver/sense amplifier unit 360 may apply a current for a write operation to a memory cell 351 in response to an external command. A column decoder 340 may generate a column selection signal to select one bit line. At a data read operation, a data voltage influenced by a resistance value of the memory cell 351 may be transferred to the write driver/sense amplifier unit 360. The write driver/sense amplifier unit 360 (or, a sense amplifier therein) may output a digital signal by sensing and amplifying a difference between a reference voltage and the data voltage.

Figure 11:
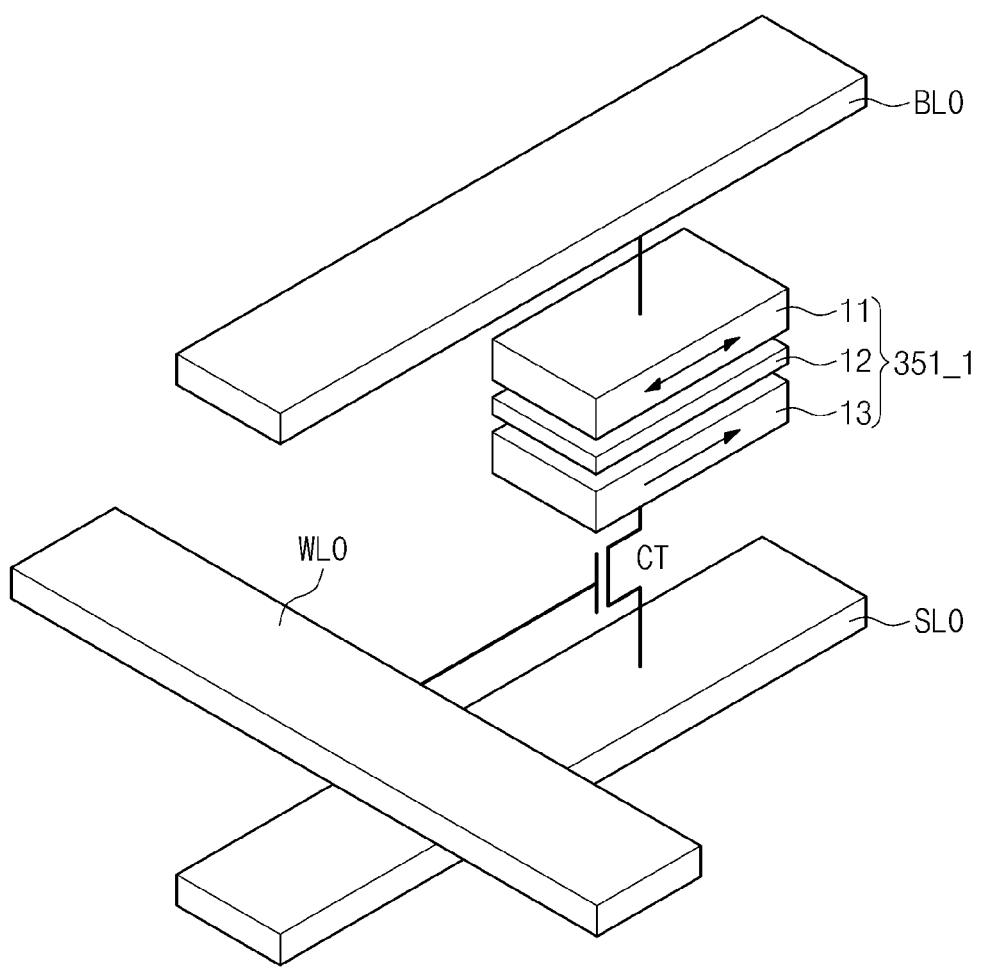
FIG. 11 is a diagram schematically illustrating a structure of a memory cell of FIG. 10.

FIG. 11 is a diagram schematically illustrating a structure of a memory cell 351 of FIG. 10.

Referring to FIG. 11, a memory cell 351 may include an MTJ element 351_1 and a cell transistor CT. A gate of the cell transistor CT may be connected with a word line (e.g., WL0), one end thereof may be connected with a bit line (e.g., BL0) through the MTJ element 351_1, and the other end thereof may be connected with a word line (e.g., SL0). The MTJ element 351_1 may include a pinned layer 13, a free layer 11, and a tunnel layer 12 interposed between the pinned layer 13 and the free layer 11. A magnetization direction of the pinned layer 13 may be fixed, and a magnetization direction of the free layer 11 may be parallel or anti-parallel with that of the pinned layer 13 according to a condition. The MTJ element 351_1 may further include an anti-ferromagnetic layer (not shown) to fix a magnetization direction of the pinned layer 13.

At a write operation of an STT-MRAM, a cell transistor may be turned on by applying a high-level voltage to the word line WL0 and a write current may be applied between the bit line BL0 and the source line SL0. At a read operation of the STT-MRAM, a cell transistor may be turned on by applying a high-level voltage to the word line WL0, and a read current may be applied in a direction from the bit line BL0 to the source line SL0. Data stored at the memory cell 351_1 may be read according to a resistance value measured under this condition.

A memory module according to an embodiment of the inventive concepts may be implemented by a buffer having a size sufficient to process user data in a pipeline manner to improve a speed.

Figure 12A:
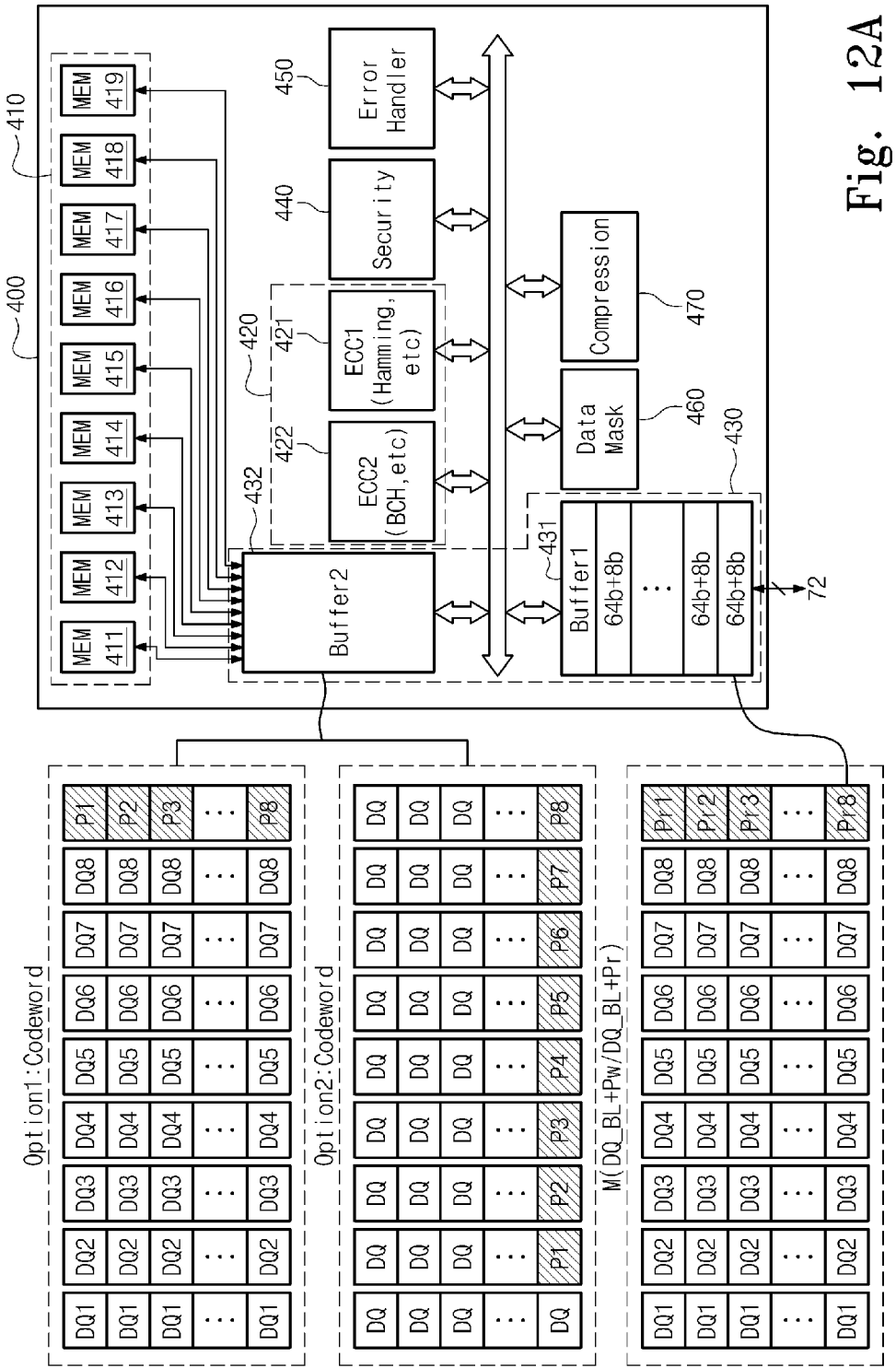
FIG. 12A is a block diagram schematically illustrating a memory module according to another embodiment of the inventive concepts.

FIG. 12A is a block diagram schematically illustrating a memory module according to another embodiment of the inventive concepts.

Referring to FIG. 12A, a memory module 400 may include a memory 410 having memories 411 to 419, an error correction circuit 420 having a first error correction circuit to perform error correction using a first error correction code ECC1 and a second error correction circuit to perform error correction using a second error correction code ECC2, a buffer 430 having a first buffer 431 and a second buffer 432 to buffer data corresponding to a burst length of 1 (BL=1), a security circuit 440 to store a security module configured to encrypt and decrypt data, an error correction handler 450 to control an error correction operation, a data mask circuit 460 (or, a randomizer) to inform an error location of data, and a compression circuit 470 to compress data.

At a write or read operation, the first buffer 431 may receive and transfer a first code word according to a burst operation from and to an external device. For example, at a write operation, the first code word may be received from an error correction circuit 220 of a memory management unit 200 (refer to FIG. 1) and output to the first error correction circuit 421 of the memory module 400. At a read operation, the first code word may be received from the first error correction circuit 421 of the memory module 400 and output to the error correction circuit 220 of the memory management unit 200. The first buffer may include a plurality of entries storing first code words. The first code word may be 72-bit data (64b+8b) as illustrated in FIG. 12A. The first code word transferred through the first buffer 431, that is, M-bit data DQ_BL+Pw or DQ_BL+Pr may be formed of user data bits DQ1 to DQ8 and a parity bit Pw or Pr.

The second buffer 432 may store a second code word according to a burst operation at a write or read operation. For example, at a write operation, a second code word formed of a set of user data and internal parity bits corresponding to the set of user data may be stored at the second buffer 432. Herein, the second code word stored at the second buffer 432 may have various formats according to an option. Referring to an option 1 in FIG. 12A, internal parity bits may be arranged to be the same as a plurality of first code words. Or, referring to an option 1 in FIG. 12A, internal parity bits may be gathered.

A size of the second code word may be larger than that of the first code word.

The second buffer 432 may be implemented to have a size sufficient to buffer a second code word in a pipeline manner. For example, at a write operation, while internal parity bits corresponding to a second code word are generated using the second error correction code ECC2, user data corresponding to another second code word may be received at the same time.

At a read operation, while an error of a second code word is corrected using the second error correction code ECC2, still another second code word may be received from the memory 410 at the same time.

In example embodiments, the first buffer 431 and the second buffer 432 may be formed of a buffer chip. The buffer chip may operate as follows. At a write operation, the buffer chip may receive a plurality of first cord words, form a second code word for correction of a storage error and form a plurality of first code words newly using the second code word. At a read operation, the buffer chip may receive a plurality of first code words, form a second code word, and form a plurality of first code words for correction of a transfer error using the second code word thus formed.

The memory module 400 may include the second buffer 432 sufficient to process user data corresponding to a second code word in a pipeline manner, so that an error correction speed is improved.

A memory system 10 of FIG. 1 may be configured to correct an error of a transfer channel and to correct a data storage error at a memory module 100. However, example embodiments of the inventive concepts are not limited thereto. For example, example embodiments of the inventive concepts may be modified or changed to correct a data storage error selectively. When whether an input/output operation according to a burst operation is performed normally is checked at a test operation, an error of a transfer channel may be checked without correction of a data storage error.

The memory module according to an embodiment of the inventive concepts may further comprise a memory controller which is configured to perform a function of a memory management unit 200 partially.

Figure 12B:
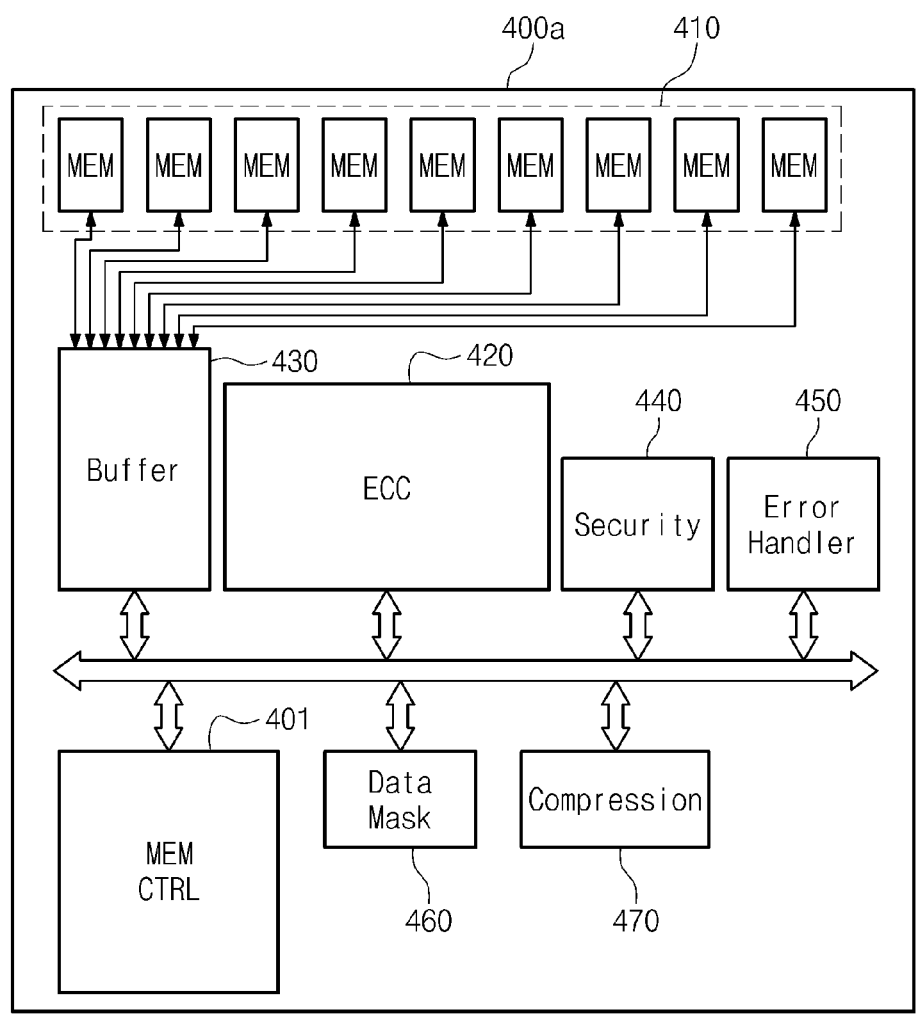
FIG. 12B is a block diagram schematically illustrating a memory module according to still another embodiment of the inventive concepts.

FIG. 12B is a block diagram schematically illustrating a memory module according to still another embodiment of the inventive concepts.

Referring to FIG. 12B, a memory module 400a may further comprise a memory controller 401 compared with that of FIG. 12A. The memory controller 401 may control memories 410 according to a request of a memory management unit 200 (refer to FIG. 1). For example, the memory controller 401 may generate signals (e.g., /RAS, /CAS, /WE, and CKE) for controlling the memories 410.

Figure 13:
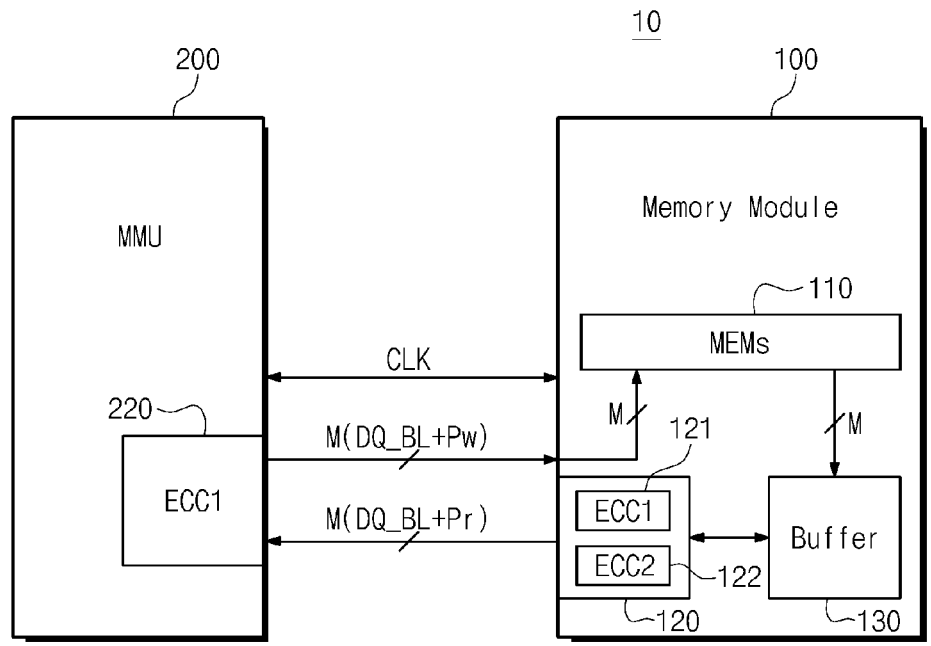
FIG. 13 is a block diagram schematically illustrating a test operation of a memory system.

FIG. 13 is a block diagram schematically illustrating a test operation of a memory system 10.

Referring to FIG. 13, at a write operation, M-bit write data DQ_BL+Pw may be stored directly at a memory 110 without passing through an error correction circuit 120. At a read operation, M-bit write data DQ_BL+Pr may be output to a memory management unit 200 through the error correction circuit 120.

A memory system 10 illustrated in FIGS. 1 to 13 may add parity bits Pw/Pr to data transferred between the memory module and the memory management unit 200. However, example embodiments of the inventive concepts are not limited thereto. The memory system 10 according to example embodiments of the inventive concepts may be implemented such that an error of a transfer channel is not corrected.

Figure 14:
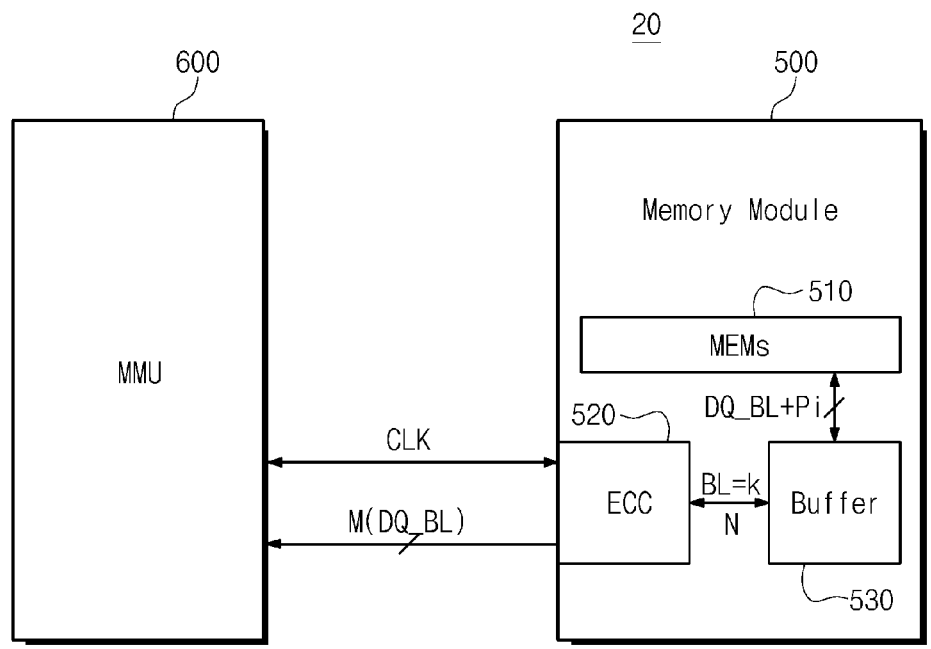
FIG. 14 is a block diagram schematically illustrating a memory system according to another embodiment of the inventive concepts.

FIG. 14 is a block diagram schematically illustrating a memory system according to another embodiment of the inventive concepts.

Referring to FIG. 14, a memory system 20 may include a memory module 500 and a memory management unit 600.

The memory module 500 may include a memory 510, an error correction circuit 520, and a buffer 530. The memory 510 may receive and output burst data formed of M-bit data DQ_BL corresponding to a burst length of 1 (BL=1) and internal parity bits Pi thereof. The error correction circuit 520 may generate internal parity bits on user data corresponding to a burst length of 1 (BL=1) at a write operation and correct an error of burst read data corresponding to a burst length of k (BL=k, k being an integer of 2 or more). At a write operation, the buffer 530 may sequentially receive M-bit data DQ_BL corresponding to a burst length of 1 (BL=1) in response to a clock CLK. At a read operation, the buffer 530 may read burst read data corresponding to a burst length of k (BL=k) from the memory 510, store burst read data error corrected by the error correction circuit 520, and output the error corrected burst read data to the memory management unit 600 by a unit of M-bit data DQ_BL corresponding to a burst length of 1 (BL=1) in response to the clock CLK.

At a write operation, the memory management unit 600 may transfer user data DQ_BL corresponding to a burst length of 1 (BL=1) to the memory module 500 in response to the clock CLK. At a read operation, the memory management unit 600 may receive error-corrected user data DQ_BL corresponding to a burst length of 1 (BL=1) from the memory module 500.

The memory system 20 may be configured to add a CRC function to data to prevent a data transfer error.

The memory system 20 may correct an error of burst read data corresponding to a burst length of k (BL=k, k being an integer of 2 or more) to improve the reliability of data.

The memory system 20 may be configured such that a plurality of memory modules is connected with a memory management unit through a parallel interface.

Figure 15:
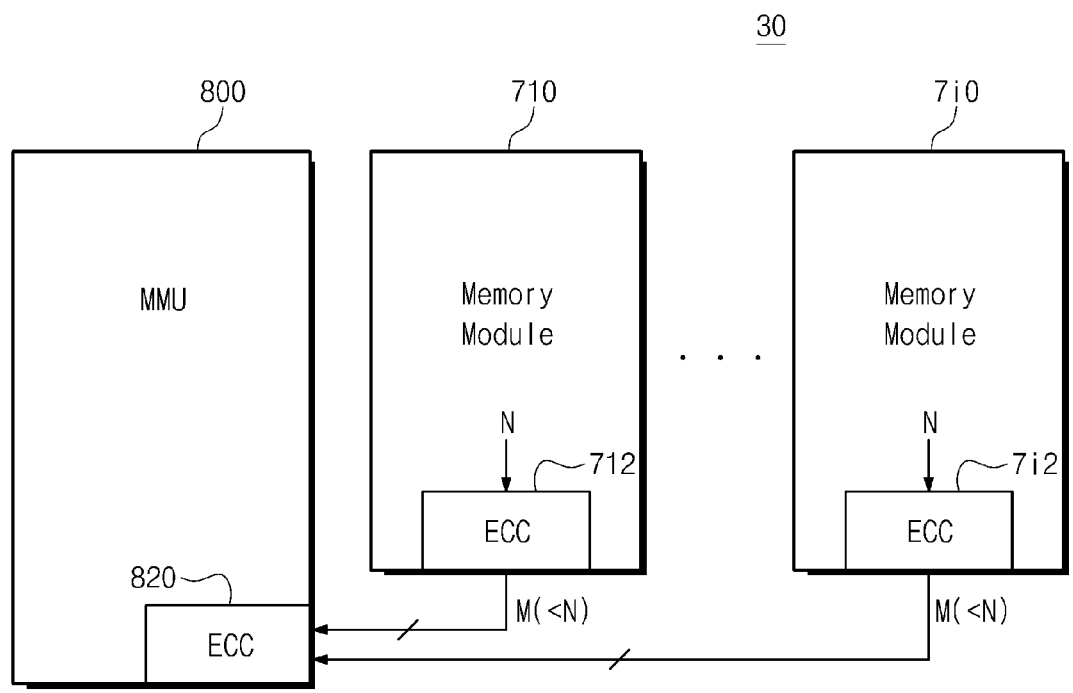
FIG. 15 is a block diagram schematically illustrating a memory system according to still another embodiment of the inventive concepts.

FIG. 15 is a block diagram schematically illustrating a memory system according to still another embodiment of the inventive concepts.

Referring to FIG. 15, a memory system 30 may include a plurality of memory modules 710 to 7$i$0 (i being a natural number of 2 or more) and a memory management unit 800 controlling the memory modules 710 to 7$i$0. The memory modules 710 to 7$i$0 may be connected with the memory management unit 800 through parallel interfaces.

Each of the memory modules 710 to 7$i$0 may be configured to inform the memory management unit 800 of a cell location, in which an error is generated, in a data masking or another manner after an error correction operation or to inform of an error location in another manner. For example, memory error information associated with an error type, an error location, an error number, an error frequency, an error processing manner, and so on may be transferred to the memory management unit 800 through a command requesting an error location and an interrupt pin.

In the memory system 30 of FIG. 15, the memory modules 710 to 7$i$0 may be connected with the memory management unit 800 through parallel interfaces. However, example embodiments of the inventive concepts are not limited thereto. For example, the memory system 30 may be implemented such that the memory modules 710 to 7$i$0 are connected with the memory management unit 800 through serial interfaces.

Figure 16:
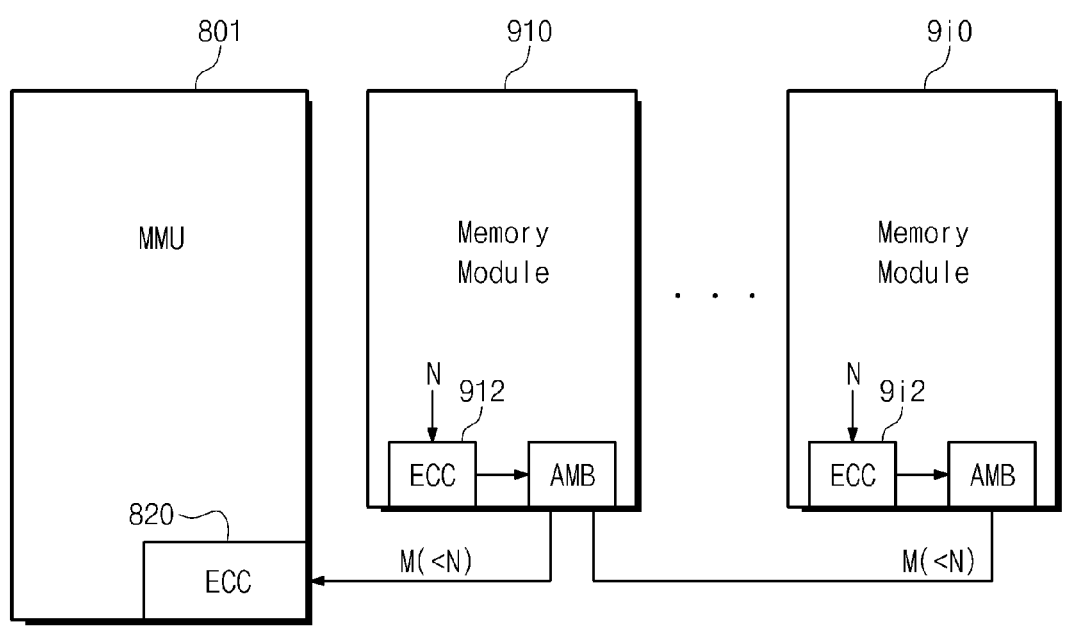
FIG. 16 is a block diagram schematically illustrating a memory system according to further still another embodiment of the inventive concepts.

FIG. 16 is a block diagram schematically illustrating a memory system according to further still another embodiment of the inventive concepts.

Referring to FIG. 16, a memory system 40 may include a plurality of memory modules 910 to 9$i$0 (i being a natural number of 2 or more) and a memory management unit 801 controlling the memory modules 910 to 9i0. The memory modules 910 to 9i0 may be connected with the memory management unit 801 through a serial interface. Each of the memory modules 910 to 9i0 may include an advanced memory buffer (AMB) for transferring data in a serial communication manner.

In FIG. 16, there is illustrated a serial interface. However, example embodiments of the inventive concepts are not limited thereto. The memory system 40 may be formed of a plurality of serial interfaces. Although not shown in figures, when a serial interface not connected with the AMB is used, a memory module may internally perform an error correction function. For this reason, an error correction function of a memory management unit (or, a host) may be optionally performed. That is, an error correction function of a memory management unit (or, a host) may be selectively performed as necessary.

Figure 17:
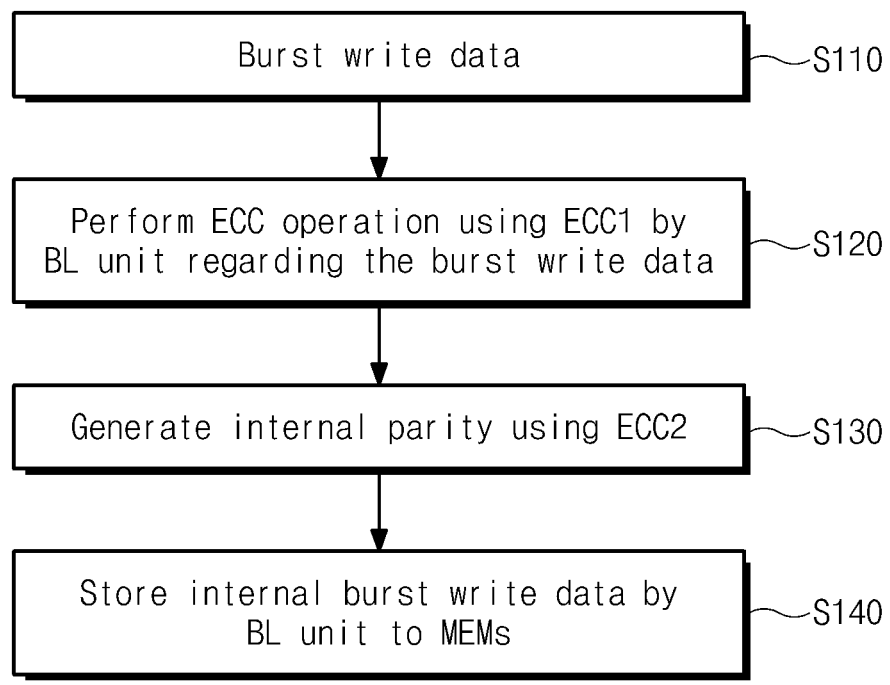
FIG. 17 is a flowchart schematically illustrating a write method of a memory system according to an embodiment of the inventive concepts.

FIG. 17 is a flowchart schematically illustrating a write method of a memory system according to an embodiment of the inventive concepts.

Referring to FIG. 17, in operation S110, a memory module 100 (refer to FIG. 1) may receive burst write data corresponding to a burst length of k (BL=k, k being an integer of 2 or more). The input burst write data may be sequentially stored at a buffer 130 (refer to FIG. 1) by a unit of M-bit data DQ_BL+Pw. In operation S120, an error correction circuit 120 may correct an error of the input burst write data by a burst length unit using a first error correction code ECC1. In operation S130, the error correction circuit 120 may generate parity bits of a set of error corrected user data DQ_BL1 to DQ_BLk (refer to FIG. 2) using a second error correction code ECC2. Afterwards, internal burst write data formed of user data DQ_BL corresponding to a burst length of 1 (BL=1) and internal parity bits Pi thereof may be stored at a memory 110 (refer to FIG. 1).

Figure 18:
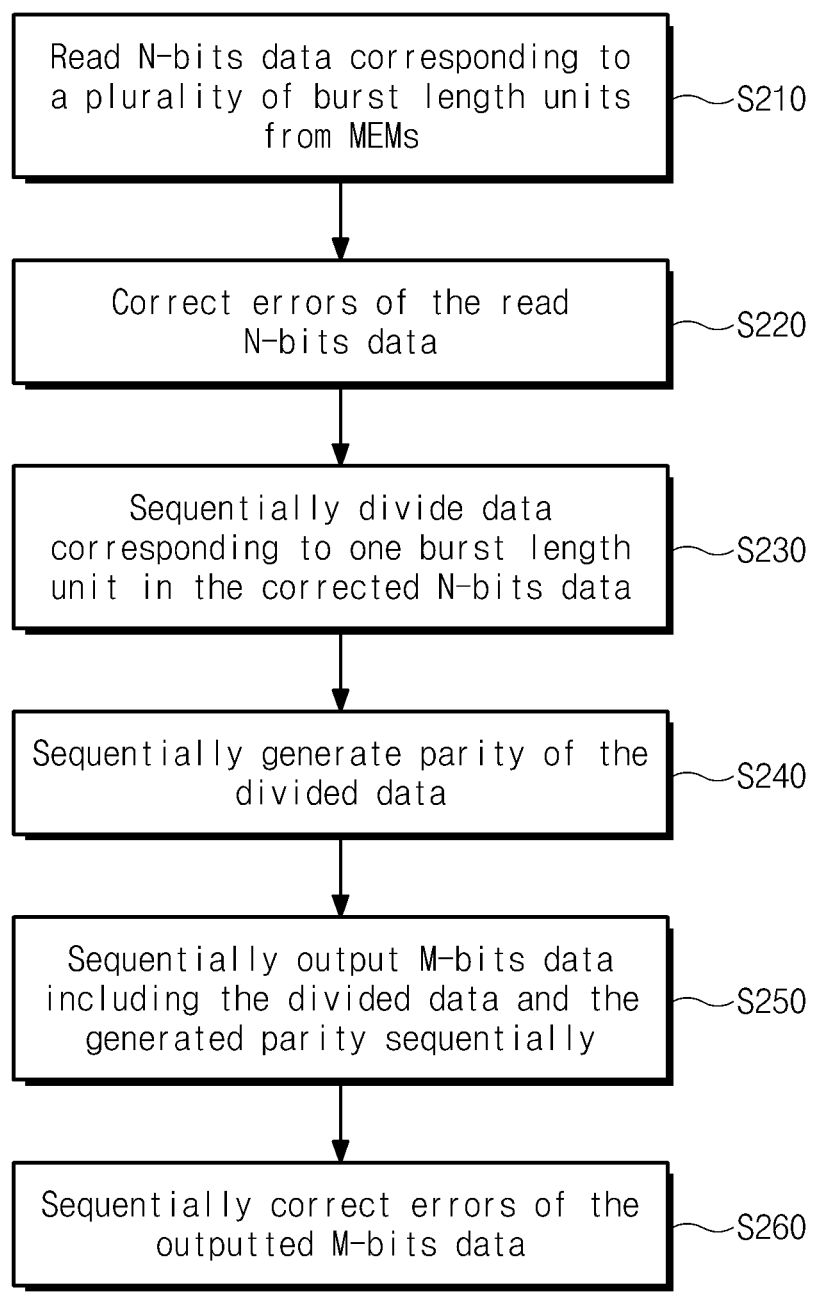
FIG. 18 is a flowchart schematically illustrating a read method of a memory system according to an embodiment of the inventive concepts.

FIG. 18 is a flowchart schematically illustrating a read method of a memory system according to an embodiment of the inventive concepts.

Referring to FIG. 18, in operation S210, N-bit data corresponding to a burst length of k (BL=k, k being an integer of 2 or more) may be read from a plurality of memories 111 to 119 (refer to FIG. 1) in response to a read command. In operation S220, an error correction circuit 120 of a memory module 100 may correct an error of the N-bit data. In operation S230, the error correction circuit 120 may divide the error corrected N-bit data by user data corresponding to a burst length of 1 (BL=1). In operation S240, the error correction circuit 120 may generate parity bits Pr (refer to FIG. 1) corresponding to each of divided user data DQ_BL.

In operation S250, a first buffer 131 (refer to FIG. 2) may sequentially receive M-bit data DQ_BL+Pr formed of the divided data DQ_BL and the parity bits Pr from the error correction circuit 120 to output M-bit data sequentially. Herein, the first buffer 131 may be implemented by an AMB (Advanced Memory Buffer) capable of performing serial communications with another memory module.

In operation S260, an error correction circuit 220 of a memory management unit 200 (refer to FIG. 1) may correct errors of M-bit data DQ_BL+Pr sequentially output from the memory module 100.

With the read method according to example embodiments of the inventive concepts, the memory module 100 may perform a first error correction operation and the memory management unit 200 may perform a second error correction operation.

With the read method according to example embodiments of the inventive concepts, the memory module 100 may determine whether an error of stored data is correctable. Based on a determination result, the memory module 100 may perform an error correction operation or directly output read data without correction.

Meanwhile, the memory system may determine whether an error of stored data is correctable. Based on a determination result, the memory system may perform an error correction operation or directly output read data without correction.

Figure 19:
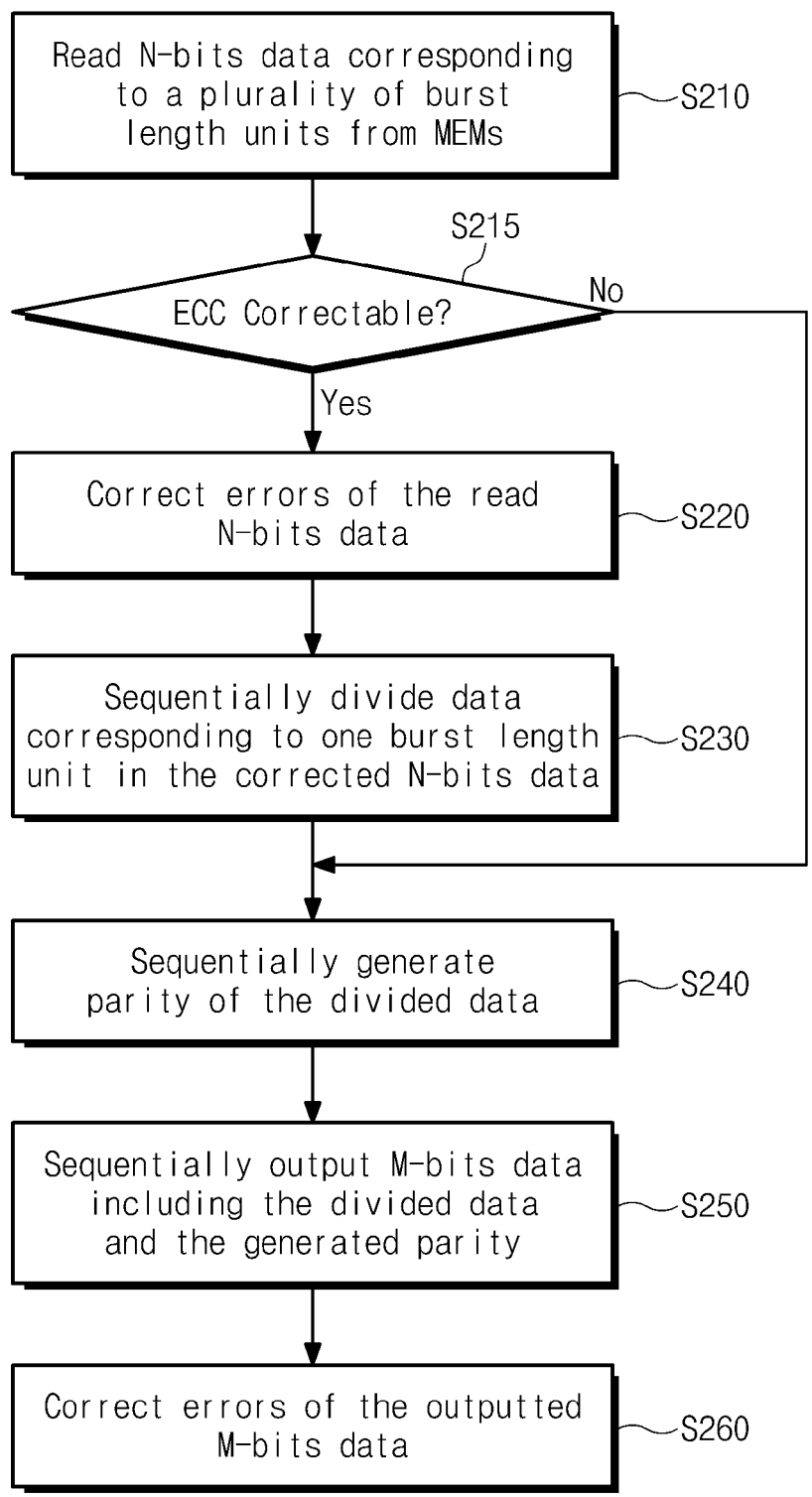
FIG. 19 is a flowchart schematically illustrating a read method of a memory system according to another embodiment of the inventive concepts.

FIG. 19 is a flowchart schematically illustrating a read method of a memory system according to another embodiment of the inventive concepts.

Referring to FIG. 19, a read method may further comprise operation S215 compared with that of FIG. 18. In operation S215, whether an error of N-bit data read is correctable may be determined. If so, the method may proceed to operation S220. If not, the method may proceed to operation S240.

With the read method of according to example embodiments of the inventive concepts, M-bit data DQ_BL+Pr may be output in different manners according to whether an error is correctable.

Figure 20:
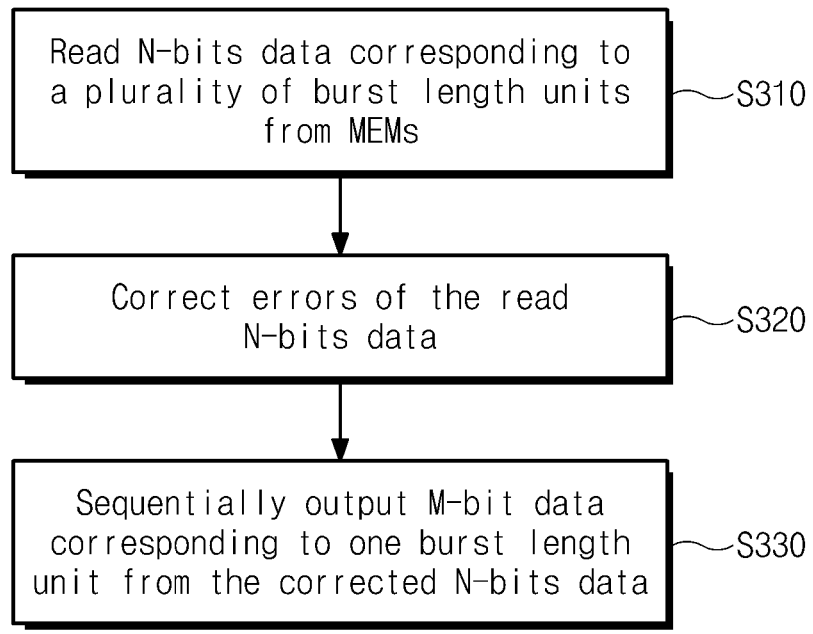
FIG. 20 is a flowchart schematically illustrating a read method of a memory system according to still another embodiment of the inventive concepts.

FIG. 20 is a flowchart schematically illustrating a read method of a memory system according to still another embodiment of the inventive concepts.

Referring to FIG. 20, N-bit data corresponding to a burst length of k (BL=k) may be read from a plurality of memories 111 to 119 (refer to FIG. 1) in response to a read command. Herein, the read N-bit data may be constituted by sequentially outputting M-bit data (M<N) corresponding to a burst length of 1 (BL=1) in plurality. That is, in operation S310, the N-bit data may be obtained by buffering a plurality of M-bit data. In operation S320, an error correction circuit 120 (refer to FIG. 1) may correct an error of the read N-bit data. In operation S330, the error correction circuit 120 may sequentially output the error corrected N-bit data by a unit of M-bit data corresponding to a burst length of 1 (BL=1).

With the read method of a memory module according to example embodiments of the inventive concepts, an error of N-bit data may be corrected and the error corrected N-bit data may be sequentially output by a unit of M-bit data.

Figure 21:
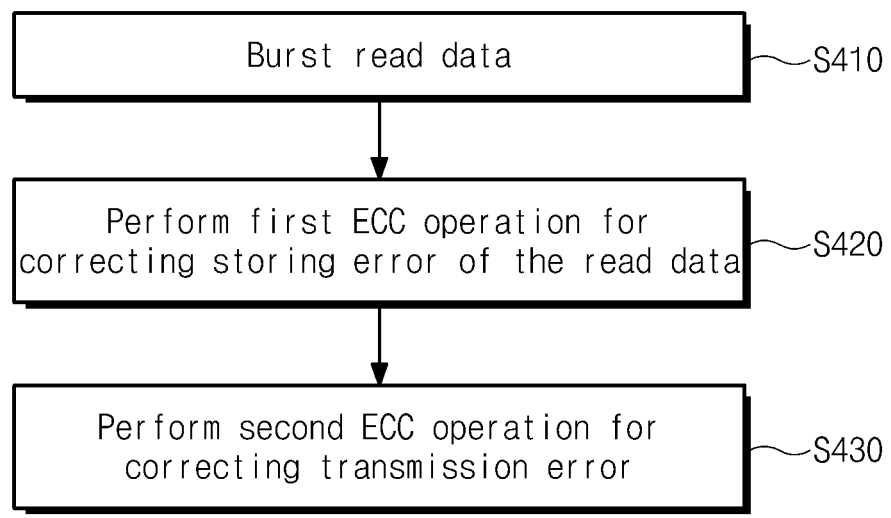
FIG. 21 is a flowchart schematically illustrating a read method of a memory system according to further still another embodiment of the inventive concepts.

FIG. 21 is a flowchart schematically illustrating a read method of a memory system according to further still another embodiment of the inventive concepts.

Referring to FIG. 21, in operation S410, data may be read from a memory 110 (refer to FIG. 1) through a burst read. In operation S420, a memory module 100 may perform a first error correction operation to correct a storage error of read data. The memory module 100 may divide the data corrected through the first error correction operation by a burst length unit, generate parity bits Pr (refer to FIG. 1) corresponding to each of the divided data, and transfer the divided data and the parity bits to a memory management unit 200. In operation S430, the memory management unit 200 may perform a second error correction operation to correct a transfer error of data.

Figure 22:
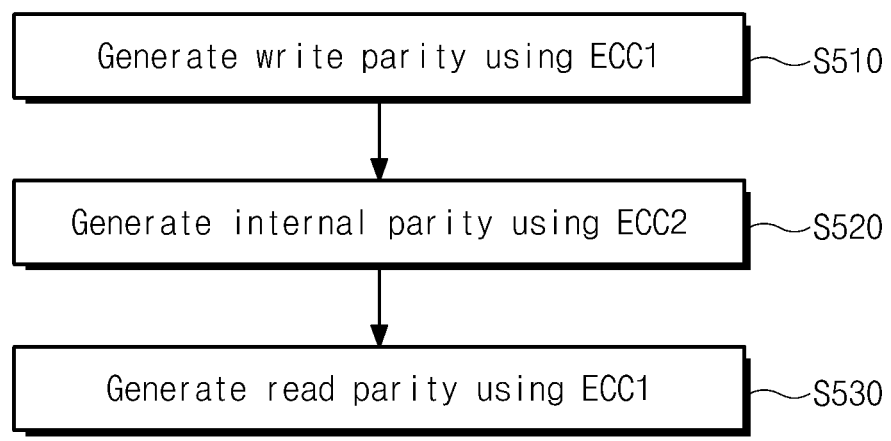
FIG. 22 is a flowchart schematically illustrating an input/output operation of a memory system according to an embodiment of the inventive concepts and an operation of generating parity associated with the input/output operation.

FIG. 22 is a flowchart schematically illustrating an input/output operation of a memory system according to an embodiment of the inventive concepts and an operation of generating parity associated with the input/output operation.

Referring to FIG. 22, in operation S510, a memory management unit 200 may generate write parity bits Pw of user data DQ_BL using a first error correction code ECC1 at a write operation. In operation S520, at a write operation, a memory module 100 may receive k M-bit write data DQ_BL+Pw each formed of user data DQ_BL and write parity bits Pw and generate internal parity bits P1 to Pk of a user data set SDQ (refer to FIG. 3) using a second error correction code ECC2. In operation S540, at a read operation, the memory module 100 may generate read parity bits Pr of user data DQ_BL, corresponding to a burst length of 1 (BL=1), from among the user data set SDQ using a first error correction code ECC1.

The memory system according to an embodiment of the inventive concepts may generate write/read parity bits Pw/Pr using the first error correction code ECC1 to correct an error of a transfer channel and generate internal parity bits Pi using the second error correction code ECC2 to correct an error associated with data writing.

Figure 23:
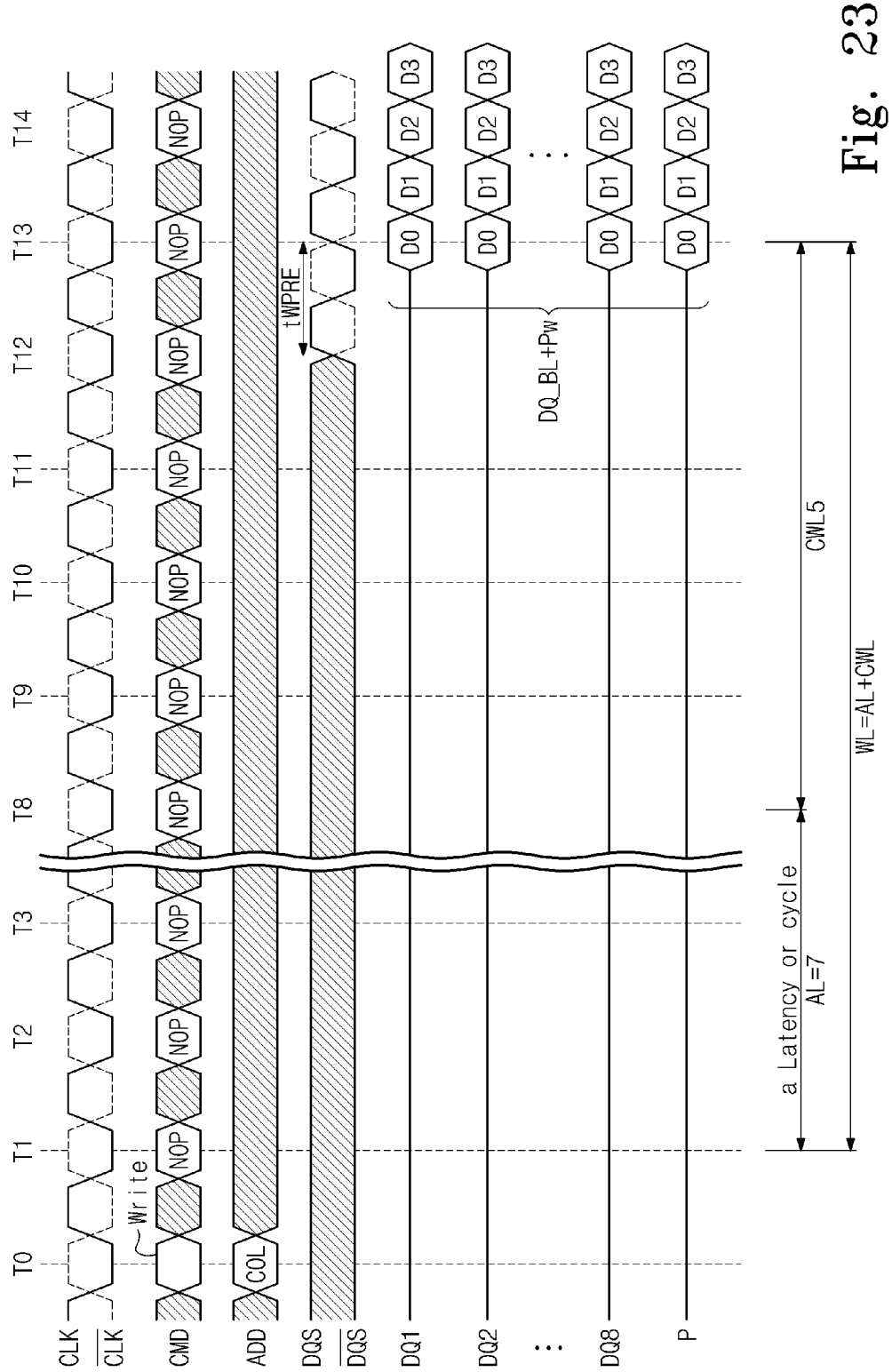
FIG. 23 is a timing diagram schematically illustrating a data output at a burst write operation of a memory system according to an embodiment of the inventive concepts.

FIG. 23 is a timing diagram schematically illustrating a data output at a burst write operation of a memory system according to an embodiment of the inventive concepts.

For ease of description, it is assumed that a burst length BL is 8. Referring to FIG. 23, a write length WL may be formed of an additive length AL and a default write length CWL. Herein, the additive length AL may include a time (e.g., four cycles) when a code word to be written is buffered by a first buffer 130 (refer to FIG. 1) and a time (e.g., three cycles) when an error of the buffered code word is corrected. Assuming that the default write length CWL correspond to five cycles, a total write length WL may be formed of 12 cycles.

Meanwhile, at a burst write operation, data from a memory management unit 200 (refer to FIG. 1) can be directly stored at memories 111 to 119 (refer to FIG. 2) without passing through a first the error correction circuit 120. In this case, the additive length AL may be unnecessary.

In other example embodiments, data from the memory management unit 200 can be buffered through a second buffer 132 and then directly stored at the memories 111 to 119 (refer to FIG. 2) without passing through the first the error correction circuit 120. In this case, the additive length AL corresponding to four cycles may be necessary.

Figure 24:
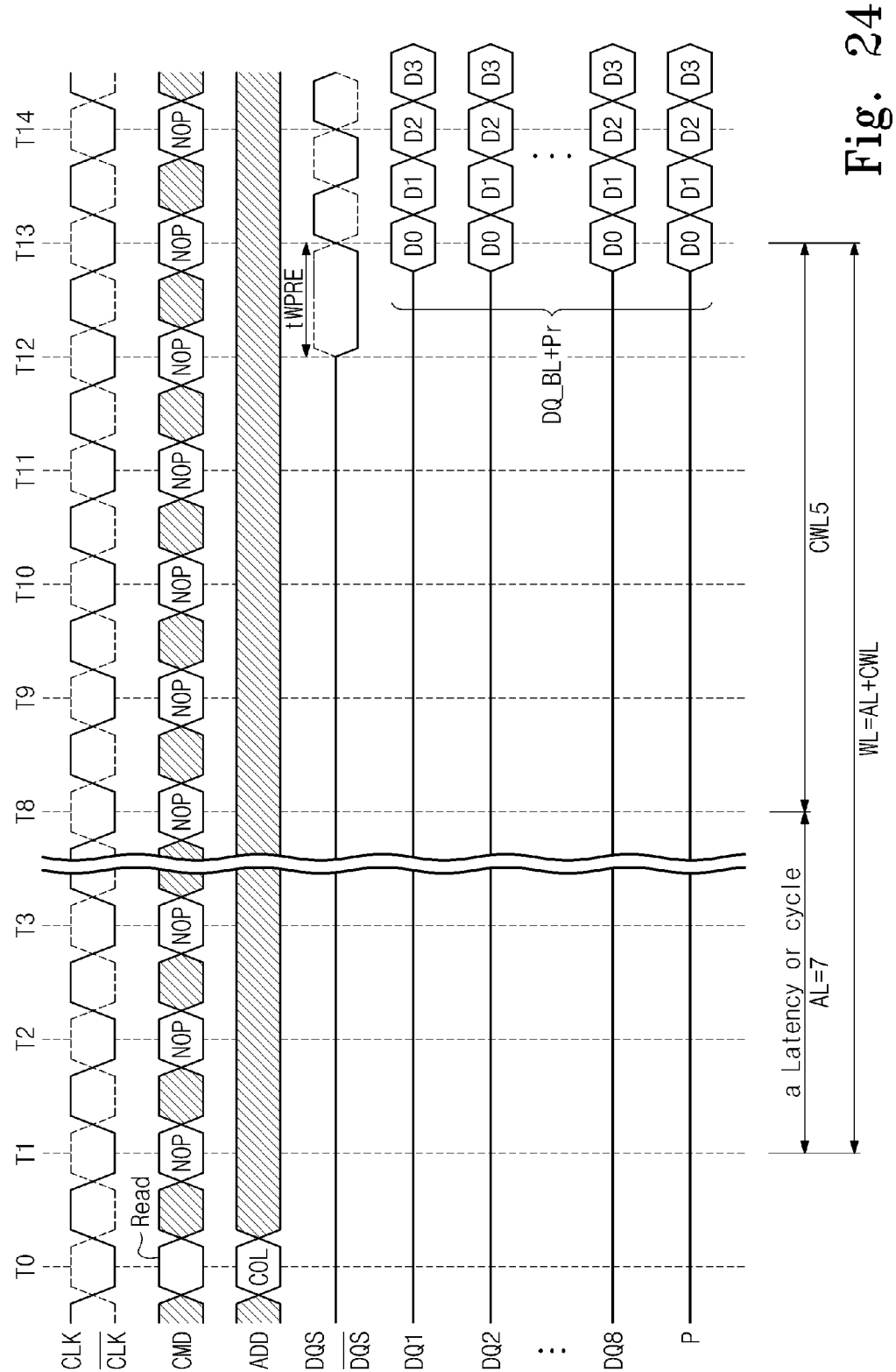
FIG. 24 is a timing diagram schematically illustrating a data output at a burst read operation of a memory system according to an embodiment of the inventive concepts.

FIG. 24 is a timing diagram schematically illustrating a data output at a burst read operation of a memory system according to an embodiment of the inventive concepts.

For ease of description, it is assumed that a burst length BL is 8. Referring to FIG. 24, a read length WL may be formed of an additive length AL and a default read length CL. Herein, the additive length AL may include a time (e.g., four cycles) when a code word to be read is buffered by a first buffer 130 (refer to FIG. 1) and a time (e.g., three cycles) when an error of the buffered code word is corrected. Assuming that the default read length CL correspond to five cycles, a total read length WL may be formed of 12 cycles.

With a read operation of a memory system according to example embodiments of the inventive concepts, 72-bit data may be sequentially output in synchronization with a clock CLK.

Figure 25:
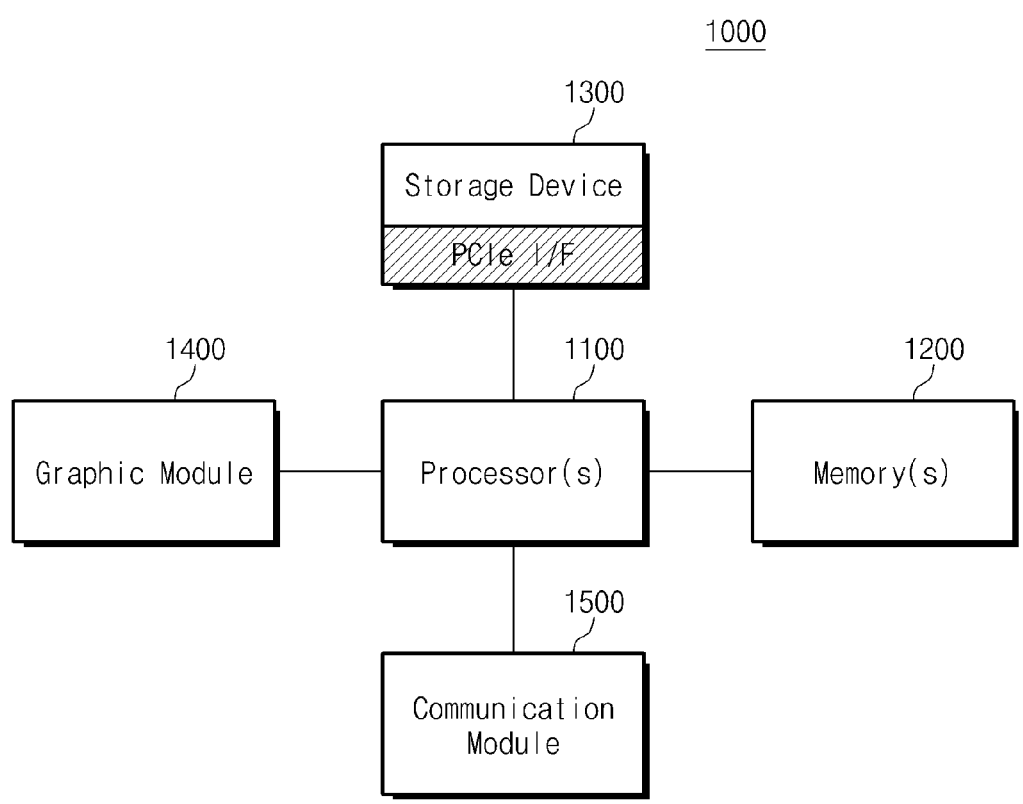
FIG. 25 is a block diagram schematically illustrating a mobile device according to an embodiment of the inventive concepts.

FIG. 25 is a block diagram schematically illustrating a mobile device according to an embodiment of the inventive concepts.

Referring to FIG. 25, a mobile device 1000 may include at least one processor 1100, at least one memory 1200, at least one storage device 1300, a graphic module 1400, and a communication module 1500. The at least one memory 1200 may include a memory module according to example embodiments of the inventive concepts. The storage device 1300 may be connected with the processor 1100 through a PCIe (or, SATAe) interface. Herein, an interface of the storage device 1300 may not be limited to the PCIe (or, SATAe) interface. For example, the storage device 1300 may use one of various interfaces (e.g., SATA, SAS, UFS, eMMC, Infiniband, FC, etc.). The mobile device 1000 is applicable to a Galaxy S, a Galaxy note, a Galaxy tap, an iPhone, an iPad, and the like.

In FIGS. 1 to 25, there is described an example where each memory in a memory module according to example embodiments of the inventive concepts performs a burst operation. However, example embodiments of the inventive concepts are not limited thereto. Although memories don't perform a burst operation, they may be implemented such that data stored at a buffer corresponds to a burst operation. For example, at a write operation, a memory module may sequentially store data corresponding to a burst length of k (BL=k) of a code word size at a buffer and then store the buffered data at memories at the same time. Also, at a read operation, the memory module may read a code word size of data from memories at the same time and sequentially output the read data by a unit of data corresponding to a burst length of 1 (BL=1). Although it looks as if a burst write operation and a burst read operation are performed when viewed from the exterior, the memory module may write and read internally buffered data.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A memory module, comprising:
    memories configured to perform a burst operation;
    an error correction circuit configured to receive N-bit data corresponding to a plurality of burst length units from the memories, to correct a storage error of the N-bit data using a storage error correction code, to divide the corrected data into a plurality of divided data units, to generate parity bits for each of the divided data units using a transfer error correction code, and to sequentially output a plurality of M-bit data units each corresponding to one burst length unit and each formed of a respective one of the plurality of divided data units and at least one corresponding bit from among the generated parity bits;
    a first buffer configured to store the M-bit data sequentially from the error correction circuit; and
    a second buffer configured to store the N-bit data.

2. The memory module of claim 1, wherein each of the memories is a magnetic resistance memory.

3. The memory module of claim 1, wherein the N-bit data is formed of a set of user data and a set of parity bits for detecting an error of the user data, and
    wherein the error correction circuit includes,
        a check bit generator configured to generate check bits based on the set of user data;
        a comparator configured to compare the check bits and the set of parity bits to generate a syndrome according to the comparison result;
        an error status register configured to store information indicating that the comparison result indicates generation of an error;
        an error correction engine configured to receive the set of user data and the syndrome and to correct an error of the set of user data using the storage error correction code; and
        a buffer configured to store the error corrected data.

4. The memory module of claim 1, wherein the memory module is configured such that, at a test operation, write data to be written corresponding to one burst length unit is directly stored at the memories without passing through the error correction circuit.

5. The memory module of claim 1, wherein the memory module is configured such that, at a burst write operation, data to be written corresponding to a plurality of burst length units is stored at the memories after an error of the data to be written is corrected by the error correction circuit.

6. The memory module of claim 1, wherein the memory module is configured such that the M-bit data is output in response to a clock and the clock is generated in the memory module.

7. A memory system, comprising:
at least one memory module configured to read N-bit data corresponding to a plurality of burst length units from memories through a burst read operation, to correct a storage error of the read N-bit data using a storage error correction code, to divide the storage error corrected data into a plurality of divided data units, to generate read parity bits on each of the divided data units using a transfer error correction code, and to sequentially output a plurality of first M-bit data units each corresponding to one burst length unit and each formed of a respective one of the plurality of divided data units and at least one corresponding bit from among the generated parity bits, M and N being positive integers, M being less than N; and
a memory management unit configured to receive the first M-bit data units from the at least one memory module and to correct a transfer error of the M-bit data using the transfer error correction code,
wherein the at least one memory module includes a plurality of memory modules connected with the memory management unit through a serial interface.

8. A method of driving a memory system which includes at least one memory module and a memory management unit controlling the at least one memory module, the driving method comprising:
reading data corresponding to a plurality of burst length units;
performing a first error correction operation on the read data using a storage error correction code;
dividing the data corrected through the first error correction operation by data corresponding to one burst length unit; and
performing a second error correction operation on the divided data using a transfer error correction code different from the storage error correction code.

9. The method of claim 8, wherein the storage error correction code is a BCH code and the transfer error correction code is a hamming code.

10. A method of writing to a memory module, comprising:
receiving write data corresponding to a plurality of burst length units;
correcting an error of the write data by a burst length unit using a transfer error correction code;
generating internal parity bits on the error corrected data using a storage error correction code;
dividing the error corrected data by data corresponding to the burst length unit; and
storing internal write data formed of the divided data and a part of the internal parity bits at a plurality of memories.

11. A memory module, comprising:
a plurality of memories;
an error correction circuit configured to correct a transfer error of a plurality of write data units each corresponding to one burst length unit using a transfer error correction code, to gather the plurality of corrected write data units, to generate internal parity bits on the gathered write data units and to store the gathered write data units and the internal parity bits at the plurality of memories, at a write operation, and to correct a storage error of read data corresponding to a plurality of burst length units and read from the plurality of memories using storage error correction code at a read operation; and
a buffer configured to receive the plurality of write data units from an external device at the write operation and to receive the read data read from the plurality of memories at the read operation,
wherein a first latency for correcting the transfer error from a write command exists at the write operation and a second latency for correcting the storage error from a read command exists at the read operation.

12. The memory module of claim 11, wherein each of the plurality of memories is formed of a magnetic resistance memory.

13. The memory module of claim 12, wherein the read data is formed of user data and read parity bits.

14. The memory module of claim 13, wherein the error correction circuit is configured to generate the read parity bits using the transfer error correction code.

15. The memory module of claim 11, wherein the plurality of write data units are each formed of user data and write parity bits.

16. The memory module of claim 11, wherein the error correction circuit comprises:
a first error correction circuit configured to correct the transfer error; and
a second error correction circuit configured to correct the storage error.

* * * * *